US010732769B2

(12) United States Patent
Kim et al.

(10) Patent No.: US 10,732,769 B2
(45) Date of Patent: Aug. 4, 2020

(54) TOUCH DISPLAY DEVICE AND TOUCH DRIVING CIRCUIT

(71) Applicant: LG Display Co., Ltd., Seoul (KR)

(72) Inventors: HyongHwan Kim, Paju-si (KR); HyeongWon Kang, Paju-si (KR); Youngwoo Jo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 62 days.

(21) Appl. No.: 16/172,169

(22) Filed: Oct. 26, 2018

(65) Prior Publication Data
US 2019/0138150 A1 May 9, 2019

(30) Foreign Application Priority Data

Nov. 9, 2017 (KR) .................. 10-2017-0149024

(51) Int. Cl.
*G06F 3/041* (2006.01)
*G06F 3/044* (2006.01)
(52) U.S. Cl.
CPC ............ *G06F 3/0418* (2013.01); *G06F 3/044* (2013.01); *G06F 3/0443* (2019.05); *G06F 3/04164* (2019.05); *G06F 3/0412* (2013.01); *G06F 3/0445* (2019.05); *G06F 3/0446* (2019.05); *G06F 3/04166* (2019.05)
(58) Field of Classification Search
CPC ............ G06F 3/0412; G06F 3/04164; G06F 3/04166; G06F 3/0418; G06F 3/044; G06F 3/041; G02F 1/1333; G02F 1/1368; G02F 1/1343; G01R 27/26
See application file for complete search history.

(56) References Cited

U.S. PATENT DOCUMENTS

| 5,648,642 | A | * | 7/1997 | Miller | G06F 1/1626 178/18.06 |
|---|---|---|---|---|---|
| 2012/0268145 | A1 | * | 10/2012 | Chandra | G06F 3/0416 324/686 |
| 2014/0049486 | A1 | * | 2/2014 | Kim | G06F 3/041 345/173 |
| 2017/0160844 | A1 | * | 6/2017 | Li | G06F 3/044 |
| 2017/0269773 | A1 | * | 9/2017 | Suzuki | G06F 3/0416 |
| 2018/0203540 | A1 | * | 7/2018 | Maguire | G06F 3/044 |

* cited by examiner

*Primary Examiner* — Chanh D Nguyen
*Assistant Examiner* — Nguyen H Truong
(74) *Attorney, Agent, or Firm* — Fenwick & West LLP

(57) ABSTRACT

The present embodiments relate to a touch display device and a touch driving circuit, which may detect a short circuit occurring between touch electrodes and between a plurality of touch lines. The touch display device comprises: a touch display panel in which touch electrodes and a plurality of touch lines are disposed, wherein the touch electrodes are divided into n multiplexer groups and each multiplexer group comprises m touch electrodes, and the plurality of touch lines correspond to and are electrically connected to the touch electrodes; a touch driving circuit comprising a multiplexer part and a pre-amplifying part, and configured to drive the touch electrodes, wherein the multiplexer part comprises m multiplexer circuits, and the pre-amplifying part comprises m pre-amplifiers; and a touch controller configured to detect an existence of a touch or a location of a touch performed by one or more of a finger and a pen.

14 Claims, 23 Drawing Sheets

FIG.17

TOUCH DISPLAY DEVICE AND TOUCH DRIVING CIRCUIT

CROSS REFERENCE TO RELATED APPLICATION

This application claims priority to Republic of Korea Patent Application No. 10-2017-0149024, filed on Nov. 9, 2017, which is hereby incorporated by reference in its entirety.

BACKGROUND

1. Field of the Technology

The present disclosure relates to a touch display device and a touch driving circuit.

2. Description of the Related Art

With the development of information society, various demands for touch display devices for displaying images have increased. Recently, various display devices, such as liquid crystal display devices, plasma display devices, organic light emitting display devices, or the like are utilized.

Among the display devices, there is a touch display device which provides a touch-based input method such that a user can easily and intuitively input information or commands, beyond typical input methods such as a button, a keyboard, a mouse, or the like.

The touch display device includes a plurality of touch electrodes (TE) and a plurality of touch lines (TL). Particularly, when the resolution of the touch display device is increased, a short circuit may occur between neighboring touch electrodes (TE), between plurality of neighboring touch lines (TL), and between a touch electrode and a touch line close thereto.

Therefore, there is a need for a technology for detecting whether a short circuit occurs between touch electrodes (TE) and between a plurality of touch lines (TL) in the touch display device.

SUMMARY

An aspect of the present disclosure is to provide a touch display device and a driving circuit capable of detecting whether a short causing a short circuit occurs in touch electrodes, between touch electrodes (TE), between a plurality of touch lines (TL), and between touch electrodes (TE) and a plurality of touch lines (TL).

Another aspect of the present disclosure is to provide a touch display device and a driving circuit capable of detecting whether a short occurs between upper and lower touch electrodes.

Another aspect of the present disclosure is to provide a touch display device and a driving circuit capable of detecting a short occurring between upper and lower touch electrodes, as well as a short occurring between left and right touch electrodes.

In accordance with an aspect of the present disclosure, there is provided a touch display device including a touch driving circuit for driving a touch display panel and touch electrodes, and a touch controller for detecting whether or not a touch is performed by one or more among a finger and a pen and a location of the touch, based on touch sensing data received from the touch driving circuit.

In the touch display panel, touch electrodes divided into n multiplexer groups (n is a natural number greater than 1) are disposed. Each multiplexer group includes m touch electrodes (m is a natural number greater than 1). In the touch display panel, a plurality of touch lines, which correspond to and are electrically connected to the touch electrodes, are disposed.

The touch driving circuit includes a multiplexer part and a pre-amplifying part.

The multiplexer part includes m multiplexer circuits. Each multiplexer circuit is electrically connected to touch lines, each of which is electrically connected to one of m touch electrodes included in each of the n multiplexer groups. The pre-amplifying part includes m pre-amplifiers, of which input ends are electrically connected to m multiplexer circuits, respectively.

In accordance with another aspect of the present disclosure, there is provided a touch driving circuit that drives a touch display panel in which touch electrodes and a plurality of touch lines are disposed, wherein the touch electrodes are divided into n multiplexer groups (n is a natural number greater than 1) and each multiplexer group includes m touch electrodes (m is a natural number greater than 1), and the plurality of touch lines correspond to and are electrically connected to the touch electrodes.

In this instance, as described above, the touch driving circuit includes a multiplexer part and a pre-amplifying part.

According to embodiments of the present disclosure, there may be provided a touch display device and a driving circuit capable of detecting whether a short causing a short circuit occurs in touch electrodes, between touch electrodes, between a plurality of touch lines, and between touch electrodes and a plurality of touch lines.

According to embodiments of the present disclosure, there may be provided a touch display device and a driving circuit capable of detecting whether a short occurs between touch electrodes located up and down.

According to embodiments of the present disclosure, there may be provided a touch display device and a driving circuit capable of detecting a short occurring between touch electrodes located up and down, and a short occurring between touch electrodes located side to side, such as left and right touch electrodes.

BRIEF DESCRIPTION OF THE DRAWINGS

The above and other aspects, features and advantages of the present disclosure will be more apparent from the following detailed description taken in conjunction with the accompanying drawings, in which:

FIG. 17 is a diagram displaying values of control signals input into the pre-amplifiers of FIG. 16.

DETAILED DESCRIPTION OF THE EXEMPLARY EMBODIMENTS

Figure 1:
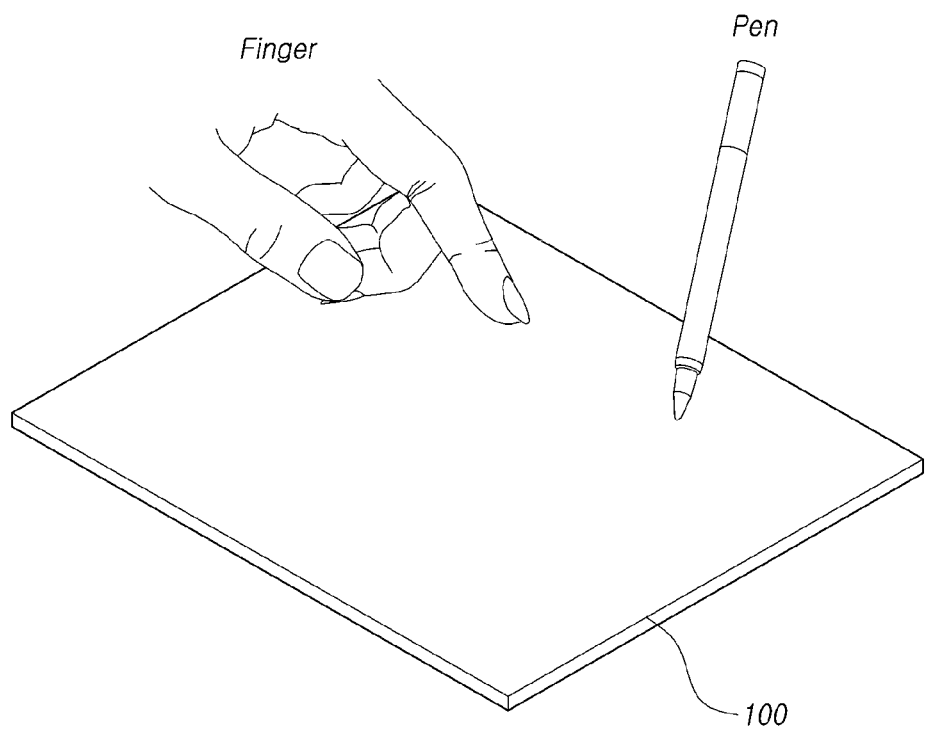
FIG. 1 illustrates a touch display device according to embodiments of the present disclosure.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 illustrates a touch display device 100 according to embodiments of the present disclosure.

The touch display device 100 according to embodiments of the present disclosure may provide an image display function, and may also provide a touch sensing function for sensing a touch performed by a finger and/or pen.

Here, "pen" may include an active pen, which may have a signal transmission/reception function, is capable of performing an operation interoperating with the touch display device 100, and has its own power supply, and may include a passive pen which does not include a signal transmission/reception function and its own power supply, or the like.

The touch display device 100 according to embodiments of the present disclosure may be, for example, a television, a monitor, or the like, or may be a mobile device, such as a tablet, a smart phone, or the like.

The touch display device 100 according to embodiments of the present disclosure may include a display part for providing an image display function, and a touch sensing part for sensing a touch.

Hereinafter, referring to FIGS. 2 to 4, the structures of the display part and the touch sensing part in the touch display device 100 will be briefly described.

Figure 2:
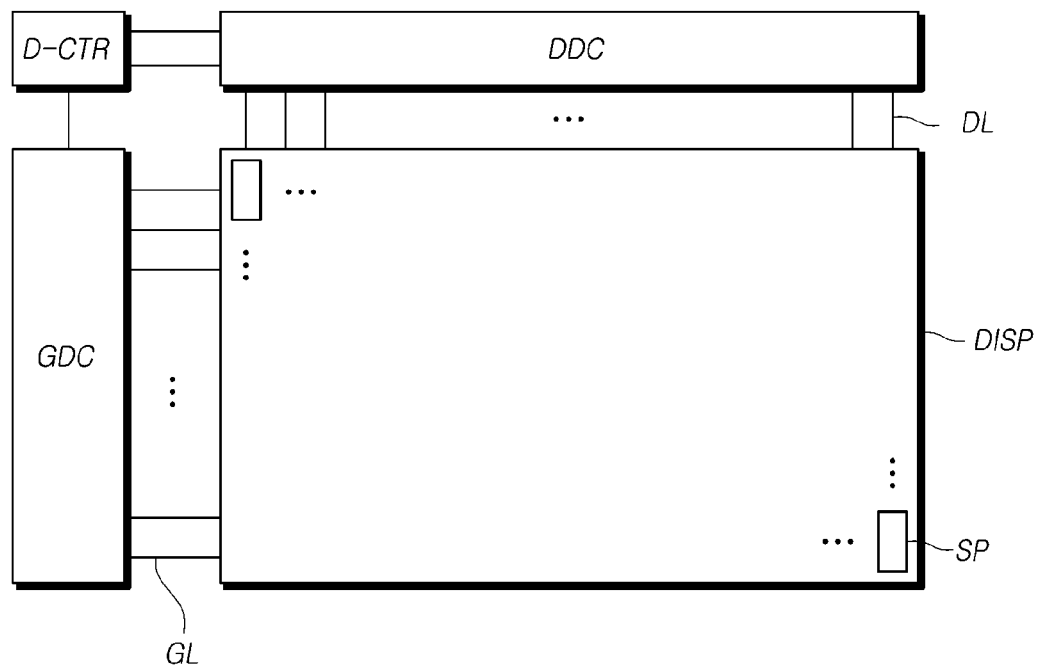
FIG. 2 illustrates a display part in a touch display device according to embodiments of the present disclosure.

FIG. 2 illustrates the display part in the touch display device 100 according to embodiments of the present disclosure.

Referring to FIG. 2, the display part of the touch display device 100 according to embodiments of the present disclosure may include a display panel (DISP), a data driving circuit (DDC), a gate driving circuit (GDC), a display controller (D-CTR), and the like.

The display panel (DISP) may be any one of various types of display panels, such as a liquid crystal display panel, an organic light emitting display panel, a plasma display panel, and the like. In the display panel (DISP), a plurality of data lines (DL) and a plurality of gate lines (GL) are disposed, and a plurality of sub-pixels (SP) are disposed, which are defined by the plurality of data lines (DL) and the plurality of gate lines (GL).

The data driving circuit (DDC) drives the plurality of data lines (DL) by supplying a data voltage to the plurality of data lines (DL). The gate driving circuit (GDC) may sequentially supply a scan signal to the plurality of gate lines (GL) so as to drive the plurality of gate lines (GL).

The display controller (D-CTR) may supply various control signals (DCS and GCS) to the data driving circuit (DDC) and the gate driving circuit (GDC), so as to control operations of the data driving circuit (DDC) and the gate driving circuit (GDC). The display controller (D-CTR) may be a timing controller (TCON) used in the general display technology, or may be a control device that includes the timing controller and further performs other control functions.

Figure 3:
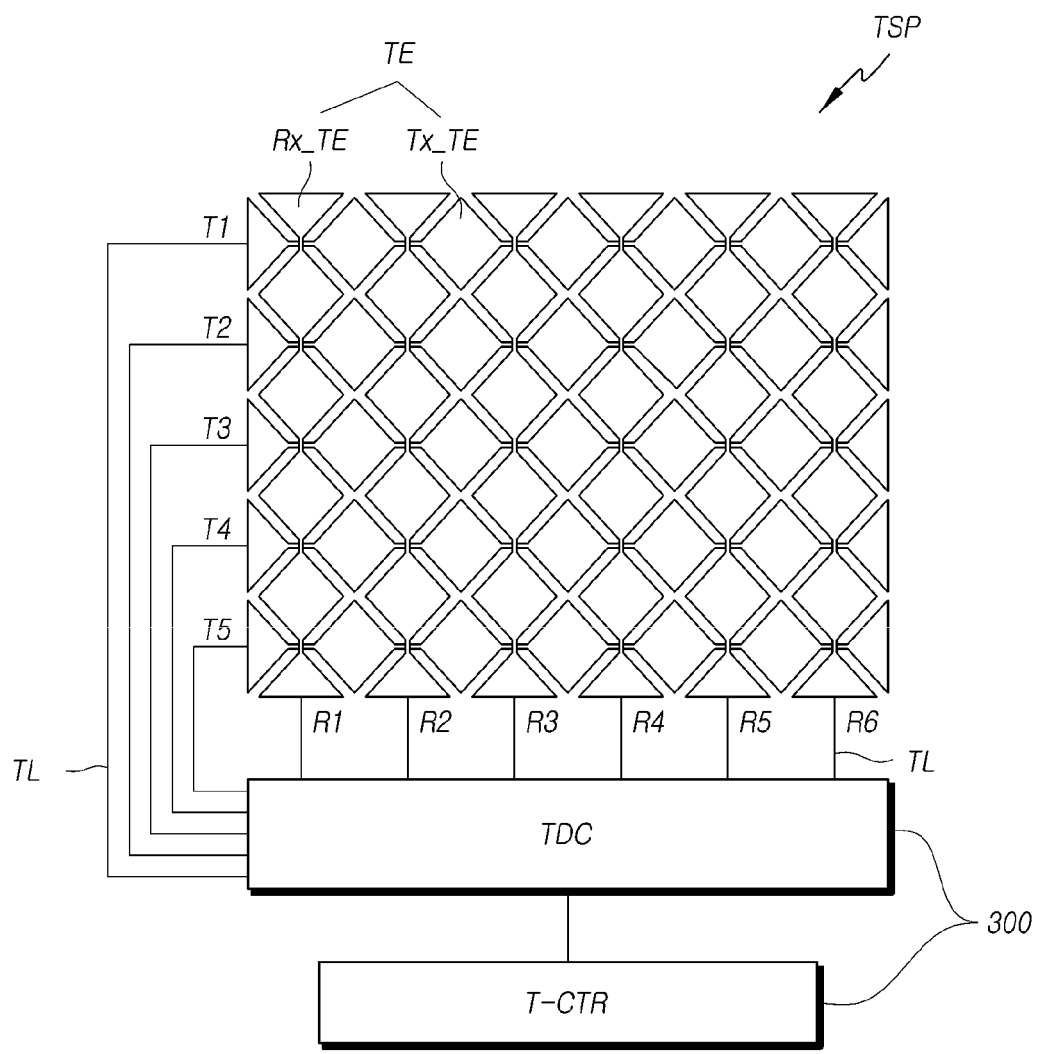
FIG. 3 is a diagram illustrating a touch sensing part for sensing a touch based on mutual capacitance, in a touch display device according to embodiments of the present disclosure.
Figure 4:
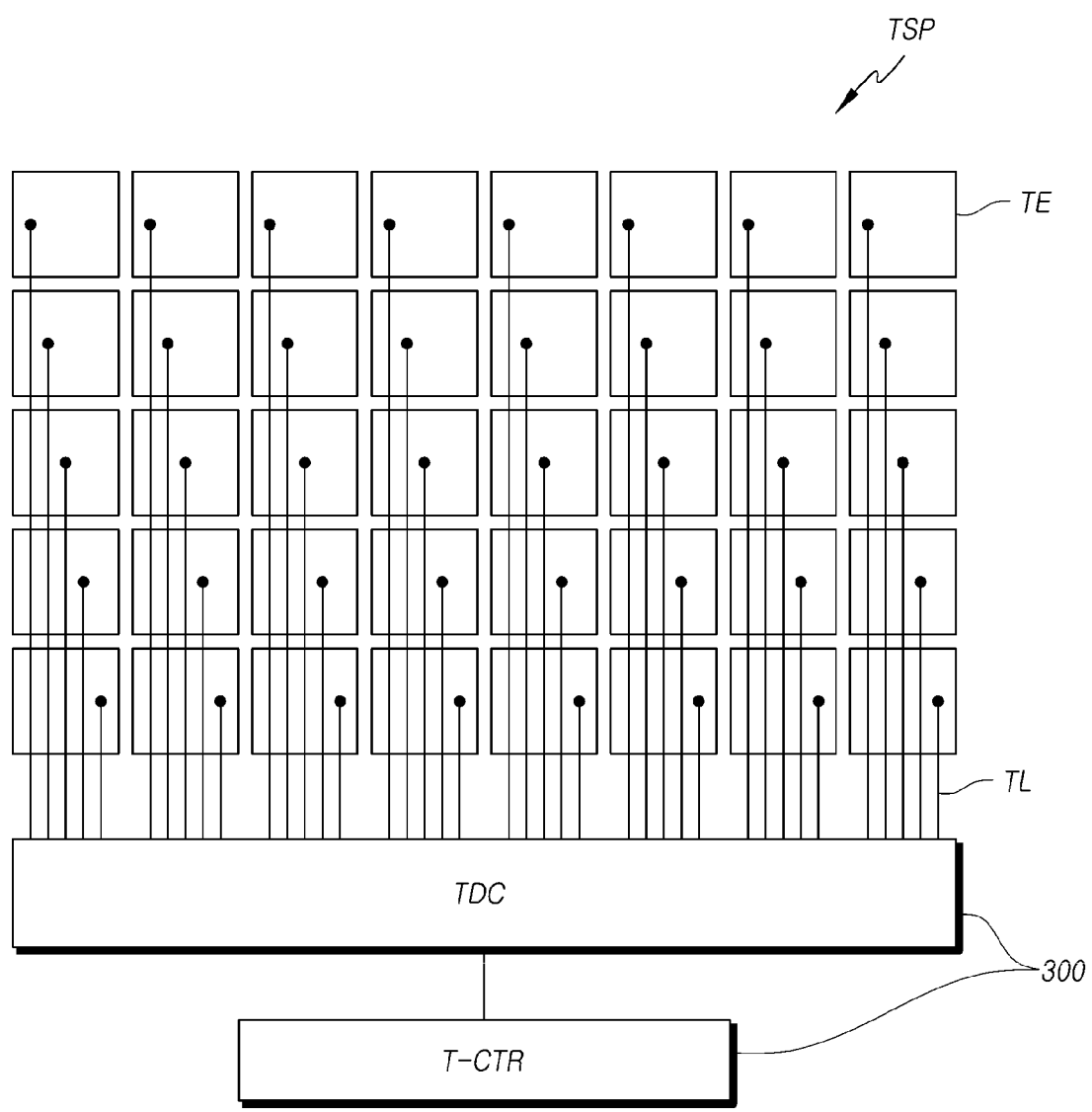
FIG. 4 is a diagram illustrating a touch sensing part for sensing a touch based on self-capacitance, in a touch display device according to embodiments of the present disclosure.
Figure 5:
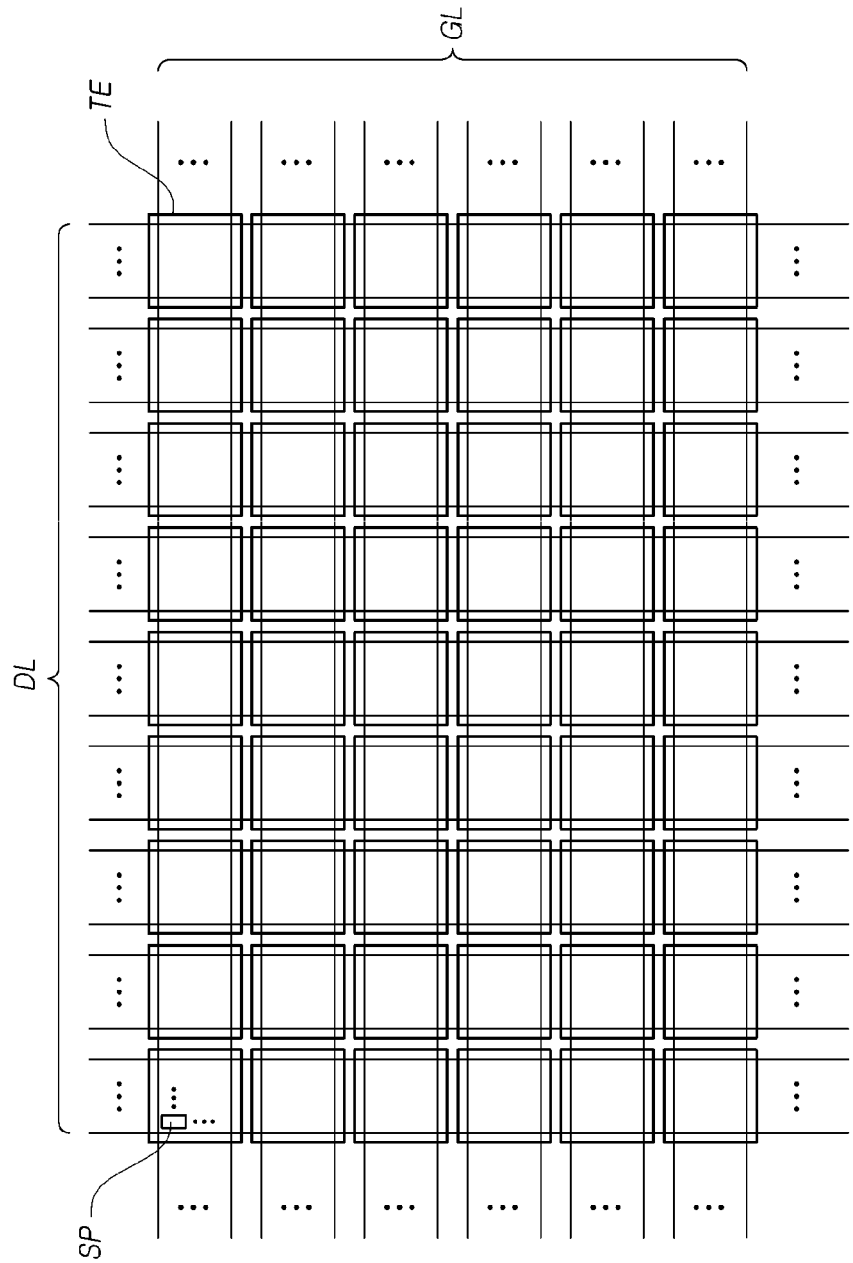
FIG. 5 is a diagram illustrating a display panel in which a touch screen panel is installed, in a touch display device according to embodiments of the present disclosure.

FIGS. 3 and 4 are diagrams illustrating two types of touch sensing parts in the touch display device 100 according to embodiments of the present disclosure. FIG. 5 is a diagram illustrating the relationship between signal lines (DL and GL) in a display panel (DISP) and touch electrodes (TE) in a touch screen panel (TSP), in the touch display device 100 according to embodiments of the present disclosure.

As illustrated in FIG. 3 and FIG. 4, the touch display device 100 according to embodiments of the present disclosure may include a touch screen panel (TSP) in which touch electrodes (TE) are disposed, and a touch circuit 300 for driving the touch screen panel, so as to sense a touch input by a finger and/or pen.

The touch display device 100 may provide a mutual-capacitance based touch sensing function which measures a capacitance or a change in the capacitance formed between two types of touch electrodes (Tx_TE and Rx_TE) in a touch screen panel (TSP) of FIG. 3, so as to sense a touch input.

Alternatively, the touch display device 100 may provide a self-capacitance based touch sensing function which measures a capacitance or a change in the capacitance formed in each touch electrode (TE) in a touch screen panel (TSP) of FIG. 4, so as to sense a touch input.

Referring to FIG. 3, for mutual-capacitance based touch sensing, first touch electrode lines (T1 to T5, also referred to as touch driving lines) to which a touch driving signal is provided and second touch electrode lines (R1 to R6, also referred to as touch sensing lines) from which a touch sensing signal is sensed are arranged, intersecting each other in the touch screen panel (TSP).

Each of the first touch electrode lines (T1 to T5) may be a bar-type electrode that extends in the horizontal direction, and each of the second touch electrode lines (R1 to R6) may be a bar-type electrode that extends in the vertical direction.

Unlike the above, as illustrated in FIG. 3, each of the first touch electrode lines (T1 to T5) may be formed as first touch electrodes (Tx_TE, also referred to as touch driving electrodes) disposed in the same row which are electrically connected. Each of the second touch electrode lines (R1 to R6) may be formed as second touch electrodes (Rx_TE, also referred to as touch sensing electrodes) disposed in the same column which are electrically connected.

Each of the first touch electrode lines (T1 to T5) may be electrically connected to the touch circuit 300 via one or more touch lines (TL). Each of the second touch electrode lines (R1 to R6) may be electrically connected to the touch circuit 300 via one or more touch lines (TL).

Referring to FIG. 4, for self-capacitance based touch sensing, a plurality of touch electrodes (TE) may be disposed in the touch screen panel (TSP).

A touch driving signal may be provided to each of the plurality of touch electrodes (TE), and a touch sensing signal may be sensed. Each of the plurality of touch electrodes (TE) may be electrically connected to the touch circuit 300 via one or more touch lines (TL).

The structure of the touch electrodes (TE) and the touch lines (TL) will be described using a first touch electrode and a second touch electrode located in the same column.

A first touch line connected to the first touch electrode may overlap the second touch electrode, but may be insulated from the second touch electrode in the touch screen panel (TSP).

A second touch line connected to the second touch electrode may be insulated from the first touch line in the touch screen panel (TSP).

Hereinafter, for ease of description, it is assumed that the touch display device 100 may provide a self-capacitance based touch sensing scheme, and the touch screen panel (TSP) is designed as illustrated in FIG. 4 for self-capacitance based touch sensing.

The shape of a touch electrode (TE) illustrated in FIGS. 3 and 4 is merely an example, and the touch electrode (TE) may be designed to have various shapes.

The size of an area where a single touch electrode (TE) is formed may correspond to the size of an area where a single sub-pixel is formed.

Unlike the above, as illustrated in FIG. 5, the size of an area where a single touch electrode (TE) is formed may be larger the size of an area where a single sub-pixel is formed. In this instance, a single touch electrode (TE) may overlap two or more data lines (DL) and two or more gate lines (GL).

When the size of the area where a single touch electrode (TE) is formed is large, the size may correspond to the size of an area of several sub-pixels to dozens of sub-pixels.

The touch screen panel (TSP) may be manufactured separately from the display panel (DISP), and may be externally coupled to the display panel (DISP) (which is referred to as an add-on type) or may be embedded in the display panel (DISP) (which is referred to as an in-cell type or an on-cell type).

The fact that a touch screen panel (TSP) is embedded in a display panel (DISP) indicates that touch electrodes (TE) and touch lines (TL) are embedded in the display panel (DISP). Hereinafter, a touch display panel indicates a display panel (DISP) in which a touch screen panel (TSP) is embedded in the display panel (DISP), and the touch display panel may be expressed as "DISP" when needed.

As illustrated in FIGS. 3 and 4, the touch circuit 300 may include one or more touch driving circuits (TDC) for supplying a touch driving signal to the touch screen panel (TSP) and detecting (receiving) a touch sensing signal from the touch screen panel (TSP), and a touch controller (T-CTR) for determining the existence and/or the location of a touch input using the result of touch sensing signal detection by the touch driving circuit (TDC).

The one or more touch driving circuits (TDC) and the touch controller (T-CTR) may be implemented as separate elements, or may be implemented as a single element.

Touch driving circuit (TDC) and data driving circuit (DDC) may be integrated and implemented as one or more integrated circuits (SRIC). That is, the touch display device 100 may include one or more integrated circuits (SRIC). Each integrated circuit (SRIC) may include one or more touch driving circuits (TDC) and one or more data driving circuits (DDC).

Figure 6:
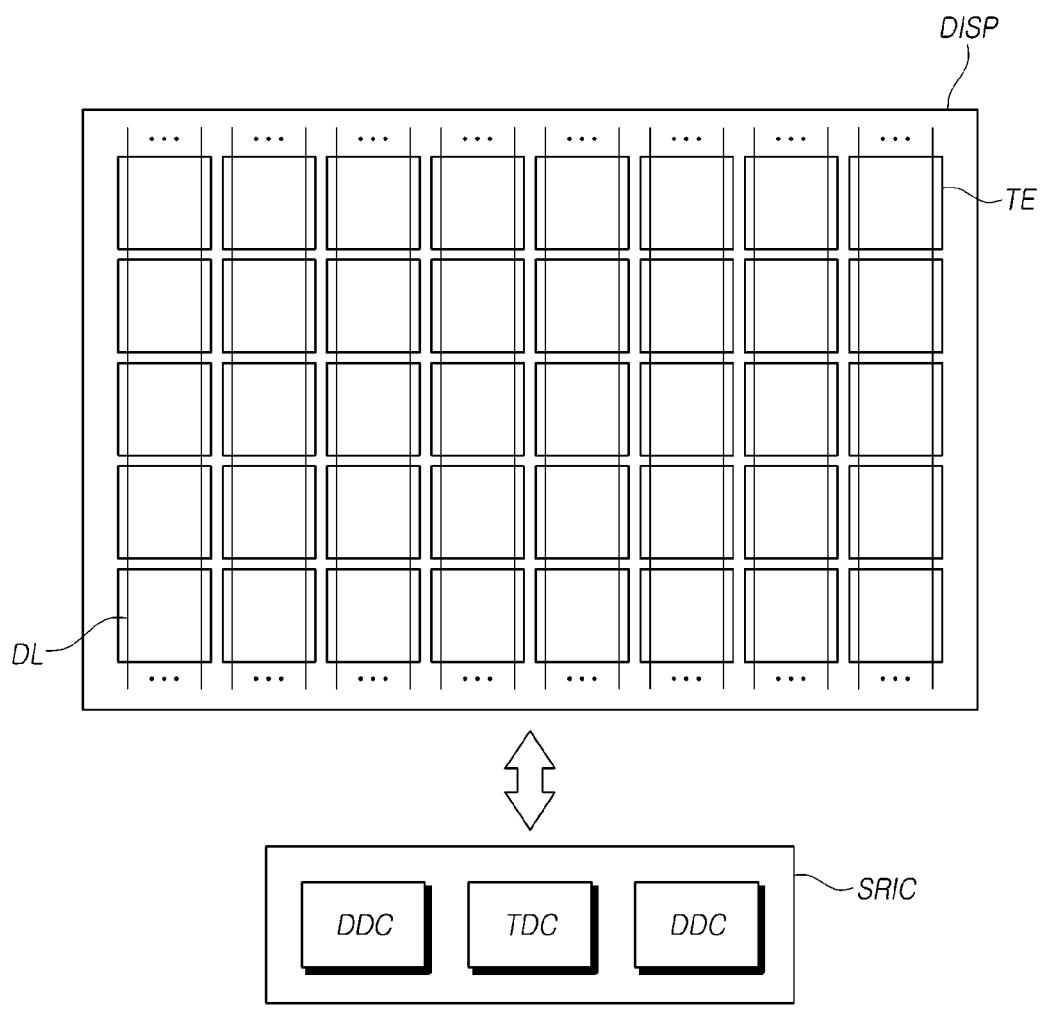
FIGS. 6 and 7 are diagrams illustrating a driving integrated circuit in which a data driving circuit and a touch driving circuit are integrated, in a touch display device according to various embodiments of the present disclosure.
Figure 7:
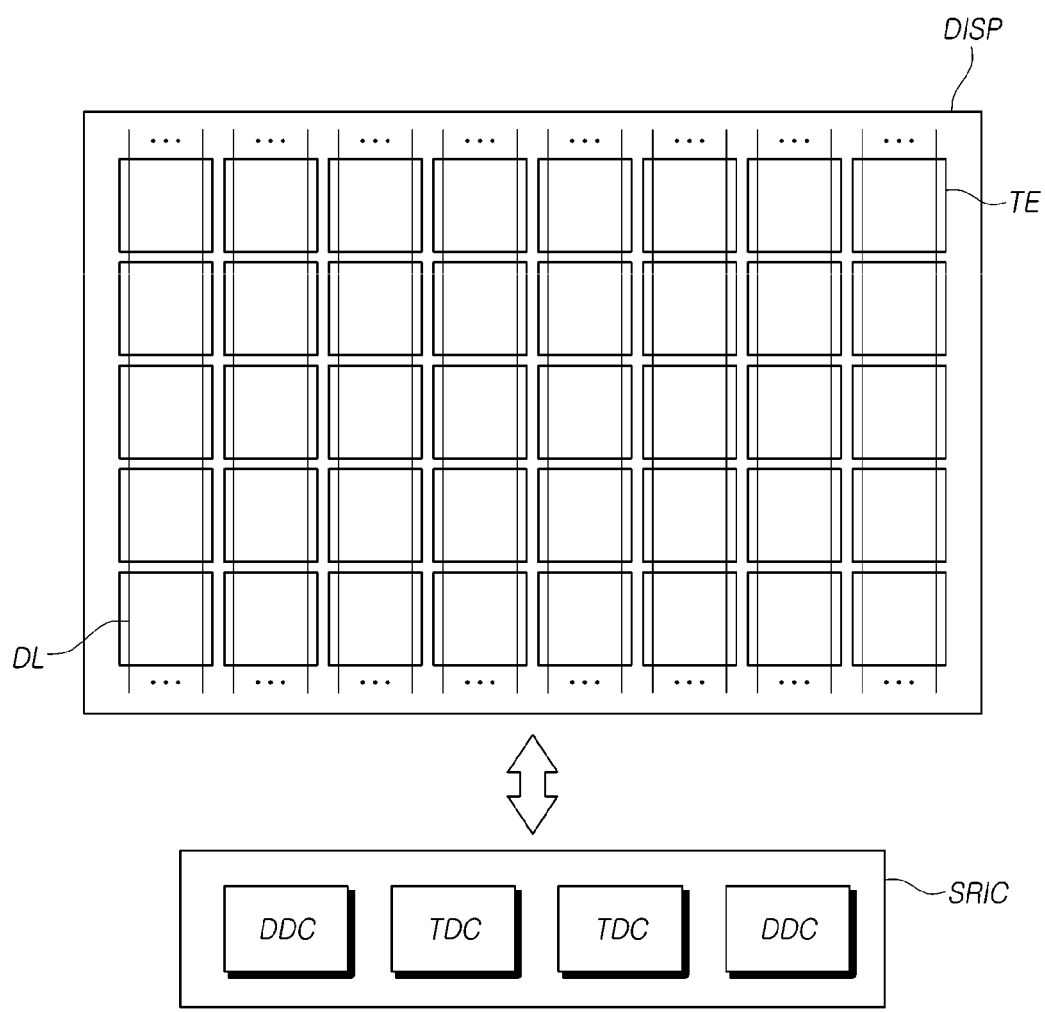

FIGS. 6 and 7 are diagrams illustrating a driving integrated circuit (SRIC) in which a data driving circuit (DDC) and a touch driving circuit (TDC) are integrated, in the touch display device 100 according to various embodiments of the present disclosure.

As illustrated in FIG. 6, each integrated circuit (SRIC) may include a single touch driving circuit (TDC) and two data driving circuits (DDC).

As illustrated in FIG. 7, each integrated circuit (SRIC) may include two touch driving circuits (TDC) and two data driving circuits (DDC). In this instance, two touch driving circuits (TDC) may respectively perform touch driving of two groups which are separate in each touch screen panel (TSP), for example, groups located up and down or groups located side to side. For example, each of the two touch driving circuits (TDC) may perform touch driving of each half of the touch screen panel (TSP), respectively.

Hereinafter, the case in which the touch display device includes a single touch driving circuit (TDC) will be described. However, the description may be equally applied even when two or more touch driving circuits (TDC) are included.

Figure 8:
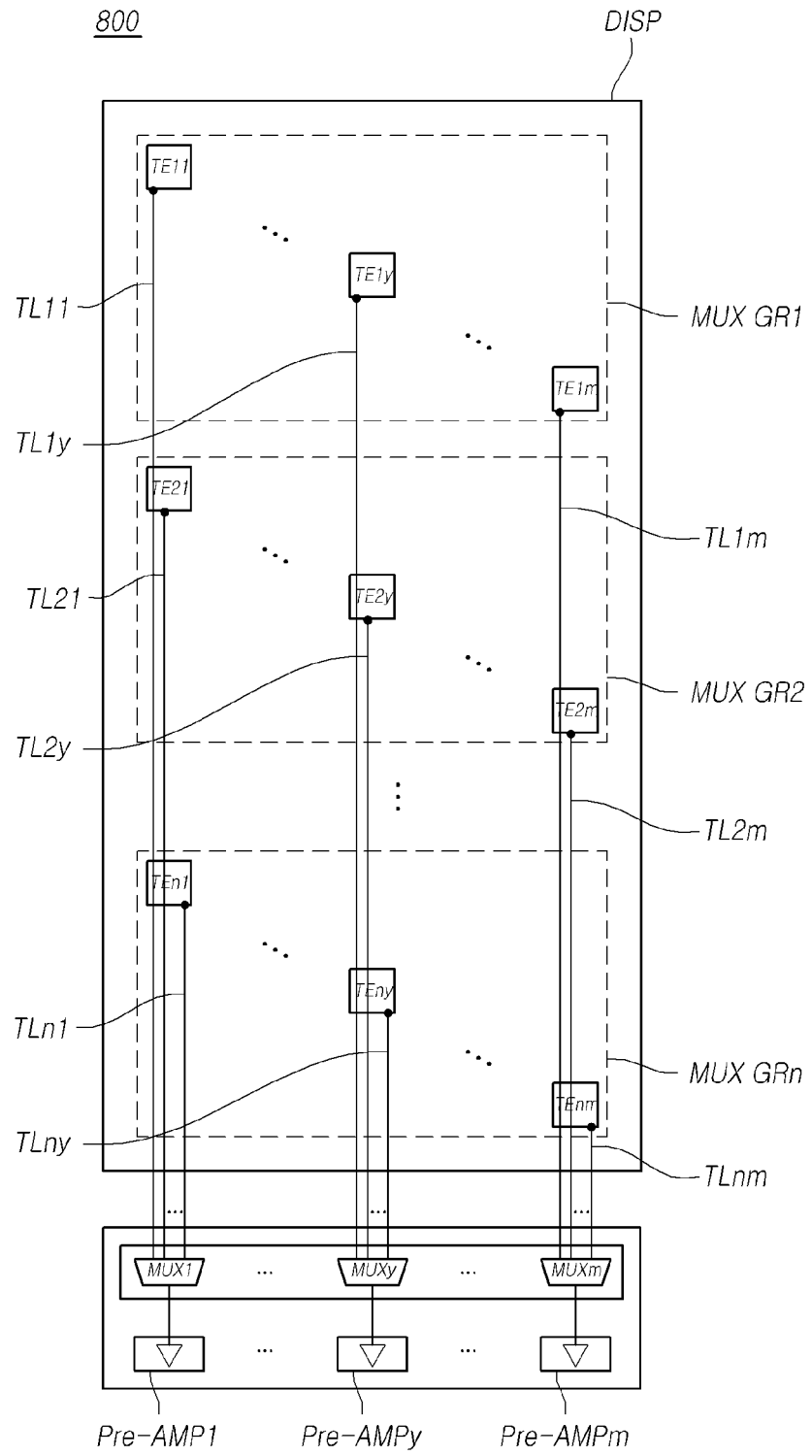
FIG. 8 is a conceptual diagram of a touch display device according to an embodiment.
Figure 9:
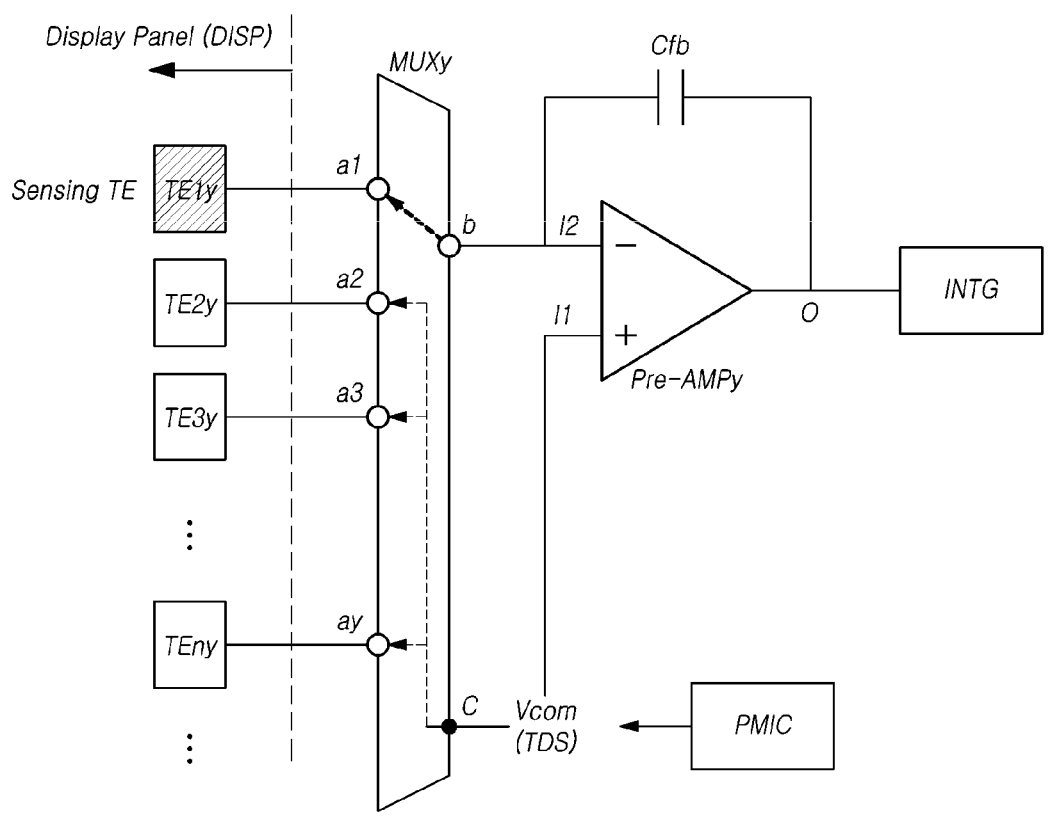
FIG. 9 is a circuit diagram of a pre-amplifying part and a single multiplexer circuit of FIG. 8 according to an embodiment.

FIG. 8 is a conceptual diagram of a touch display device according to an embodiment. FIG. 9 is a circuit diagram of a pre-amplifying part and a single multiplexer circuit of FIG. 8.

Referring to FIG. 8, a touch display device 800 according to an embodiment may include a touch display panel (DISP) and further include a touch driving circuit (TDC) for driving touch electrodes and a touch controller (T-CTR).

In the touch display panel (DISP), touch electrodes (TE) and a plurality of touch lines (TL) are disposed. The touch electrodes (TE) are divided into n multiplexer groups (MUX GR1 to GRn) (n is a natural number greater than 1), and the plurality of touch lines (TL) correspond to and are electrically connected to the touch electrodes (TE). Each multiplexer group includes m touch electrodes (TE) (m is a natural number greater than 1).

m touch electrodes included in each of the n multiplexer groups (MUX GR1 to GRn) may be disposed in the form of a matrix including two or more rows and two or more columns. For example, touch electrodes included in each of the n multiplexer groups (MUX GR1 to GRn) may have m=21, and may be disposed in the form of a matrix including three rows and seven columns.

Hereinafter, an $y^{th}$ touch electrode included in an $x^{th}$ multiplexer group (MUX GRx) is expressed as "TExy" and a touch line that corresponds to and is electrically connected to the $y^{th}$ touch electrode is expressed as "TLxy". For example, touch electrodes included in a first multiplexer group (MUX GR1) may be expressed as "TE11 to TE1m", and touch electrodes included in an $n^{th}$ multiplexer group (MUX GRn), which is the last multiplexer group, may be expressed as "TEn1 to TEnm".

The touch driving circuit (TDC) includes a multiplexer part (MUX) and a pre-amplifying part (Pre-AMP). The touch driving circuit (TDC) may additionally include an integrator (INTG), a sample-and-hold circuit (SHA), an analog-to-digital converter (ADC), and the like. A pre-amplifier (Pre-AMP) and the integrator (INTG) may be implemented as an integrated entity. The integrator (INTG) may integrate a signal output from the pre-amplifier (Pre-AMP). The analog-to-digital converter (ADC) may output, to the touch controller (T-CTR), touch sensing data obtained by converting an integral value output from the integrator (INTG) into a digital value.

The multiplexer part (MUX) includes m multiplexer circuits (MUX 1 to m). Each of the multiplexer circuits (MUX 1 to m) may be electrically connected to m touch lines (TL), each of which is electrically connected to one of the m touch electrodes (TE) included in each of the n multiplexer groups (MUX GR1 to GRn). Each of the multiplexer circuits (MUX 1 to m) may include one multiplexer or two or more multiplexers.

The pre-amplifying part (Pre-AMP) may receive a touch sensing signal from a single touch electrode that is a target of sensing among one connectable touch electrode (TE) or two or more connectable touch electrodes (TE).

The pre-amplifying part (Pre-AMP) may include m pre-amplifiers (Pre-AMP 1 to m). The pre-amplifying part (Pre-AMP) may be electrically connected to m multiplexer circuits (MUX 1 to m) via input ends (I2).

The touch controller (T-CTR) may detect the existence or location of a touch performed by one or more of a finger and a pen, based on touch sensing data received from the touch driving circuit (TDC).

A description will be provided with reference to FIG. 9. A $y^{th}$ multiplexer circuit (MUXy) (y is an integer in the range of 1 to m) may connect a pre-amplifier (pre-AMPy) to an touch electrode (TExy) that selectively becomes a target of sensing among n $y^{th}$ touch electrodes (TE1y, TE2y, . . . and TEny) included in each of the n multiplexer groups. A common voltage (Vcom) may be provided to other touch electrodes, but this may not be limited thereto.

The $y^{th}$ multiplexer circuit (Way) (y is an integer in the range of 1 to m) may connect a pre-amplifier (Pre-AMPy) to $y^{th}$ a touch electrode (TExy) that selectively becomes a target of sensing among n $y^{th}$ touch electrodes (TE1y, TE2y, . . . , and TEny) included in each of the n multiplexer groups, for example, a $y^{th}$ touch electrode (TE1y) included in a first multiplexer group (MUX GR1), as illustrated in FIG. 9, including a power management integrated circuit (PMIC)

Subsequently, the $y^{th}$ pre-amplifier (Pre-AMPy) may receive a touch sensing signal from the sensing target touch electrode (TE1y).

Via the received touch sensing signal, a feedback capacitor (Cfb) may be charged. Accordingly, a signal output to the output end (o) of the pre-amplifier (Pre-AMPy) may be input into the integrator (INTG).

Figure 10:
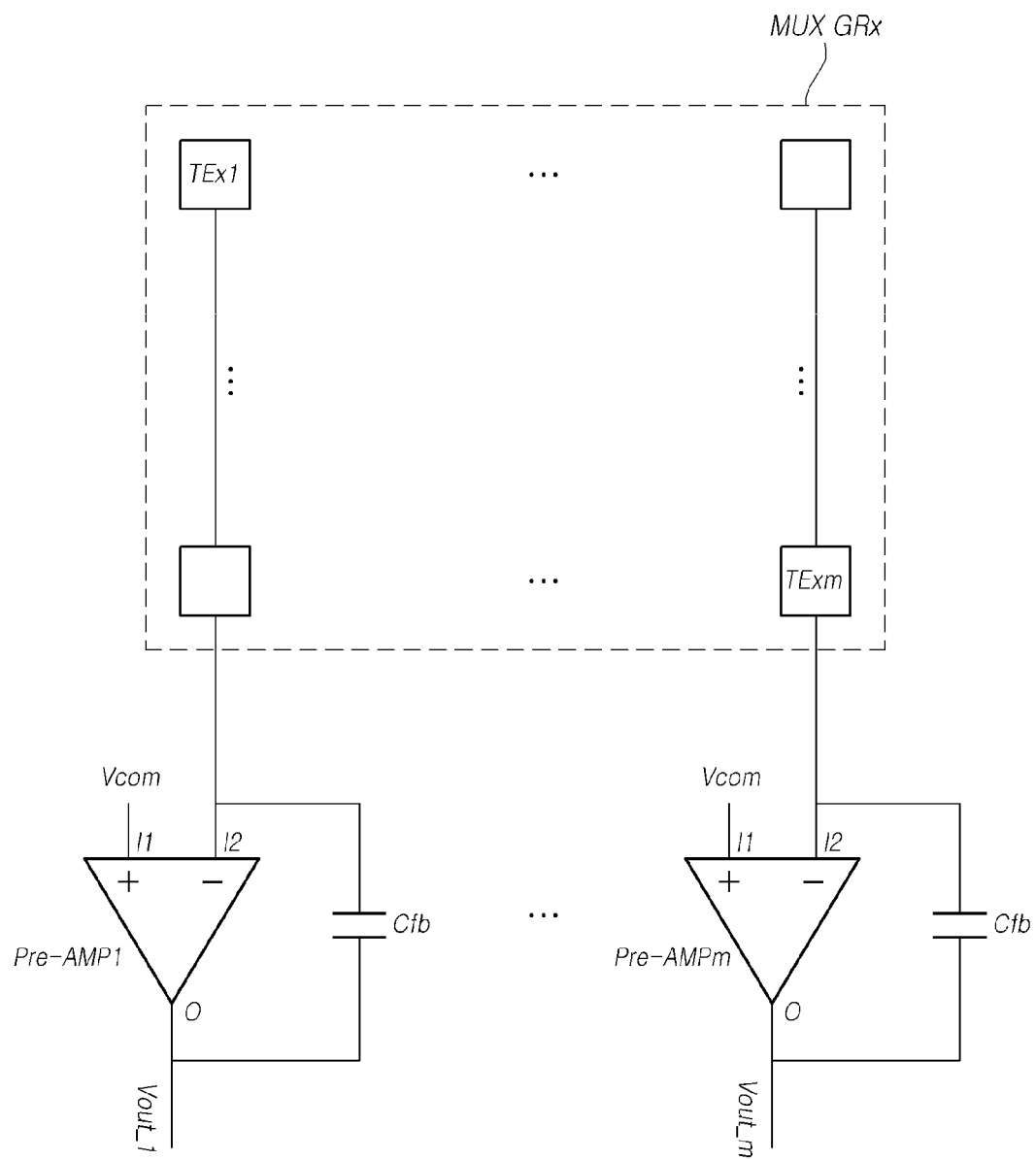
FIG. 10 is a circuit diagram in the state in which the multiplexer part of FIG. 8 selects m touch electrodes included in an $x^{th}$ multiplexer group (MUX GRx) at the same time according to an embodiment.

FIG. 10 is a circuit diagram in the state in which the multiplexer part of FIG. 8 selects m touch electrodes included in an $x^{th}$ multiplexer group (MUX GRx) at the same time.

Referring to FIG. 10, the multiplexer part (MUX) may connect m touch electrodes included in a predetermined multiplexer group (MUX GRx) to m pre-amplifiers (Pre-AMP1 to Pre-AMPm) at a predetermined point in time, and may drive the touch electrodes for each multiplexer group.

In the multiplexer part (MUX), each of the m multiplexer circuits (MUX 1 to m) selectively takes one of the m touch electrodes (TE) included in an $x^{th}$ multiplexer group (MUX GRx) as a sensing target, and connects the touch electrodes (TExy) (y is in the range of 1 to m) to m pre-amplifiers (Pre-AMP1 to Pre-AMPm).

Subsequently, the m pre-amplifiers (Pre-AMP1 to Pre-AMPm) may respectively receive touch sensing signals from the sensing target touch electrodes (TEx1 to TExm).

Via the received touch sensing signal, feedback capacitors (Cfb) may be charged. Accordingly, signals output to the output ends (o) of the m pre-amplifiers (Pre-AMPy) may be input into the integrators (INTG).

Hereinafter, there are provided embodiments for detecting whether a short occurs in a touch display panel in which touch electrodes included in each of n multiplexer groups (MUX GR1 to GRn) are arranged in the form of a matrix including three rows and seven columns (m=21).

Figure 11:
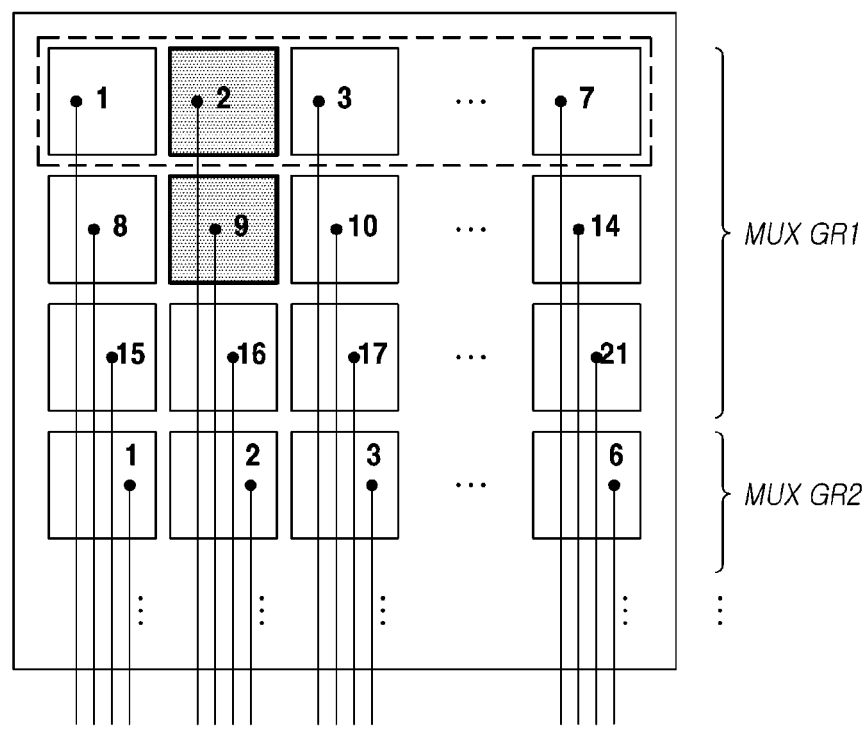
FIGS. 11 to 13 are diagrams illustrating an embodiment in which the multiplexer part of FIG. 8 drives m touch electrodes included in an $x^{th}$ multiplexer group (MUX GRx) row by row and detects whether a short occurs between an upper side and a lower side according to an embodiment.
Figure 12:
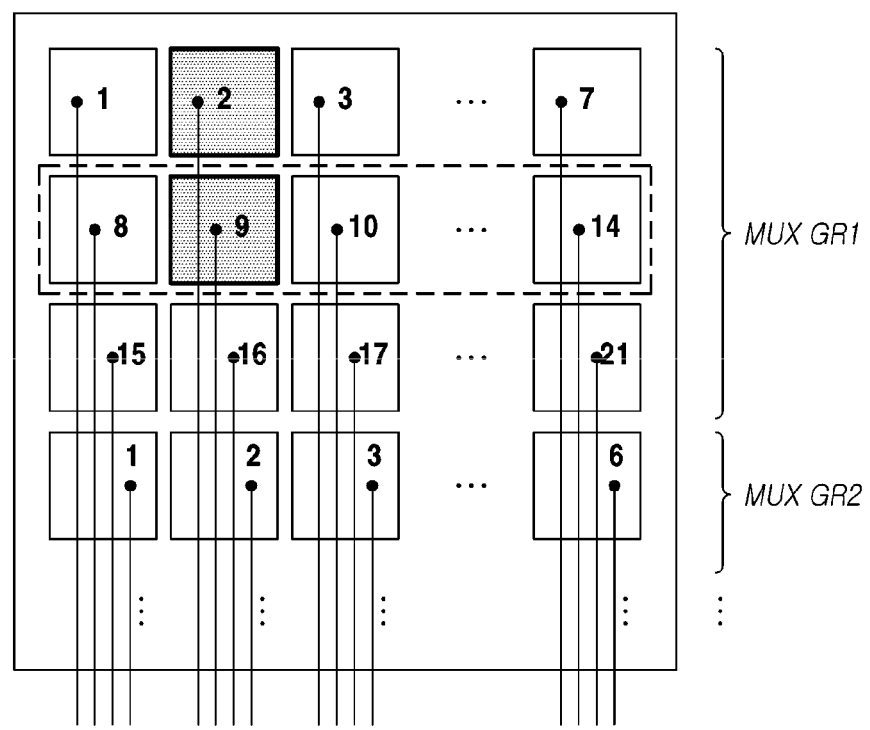
Figure 13:
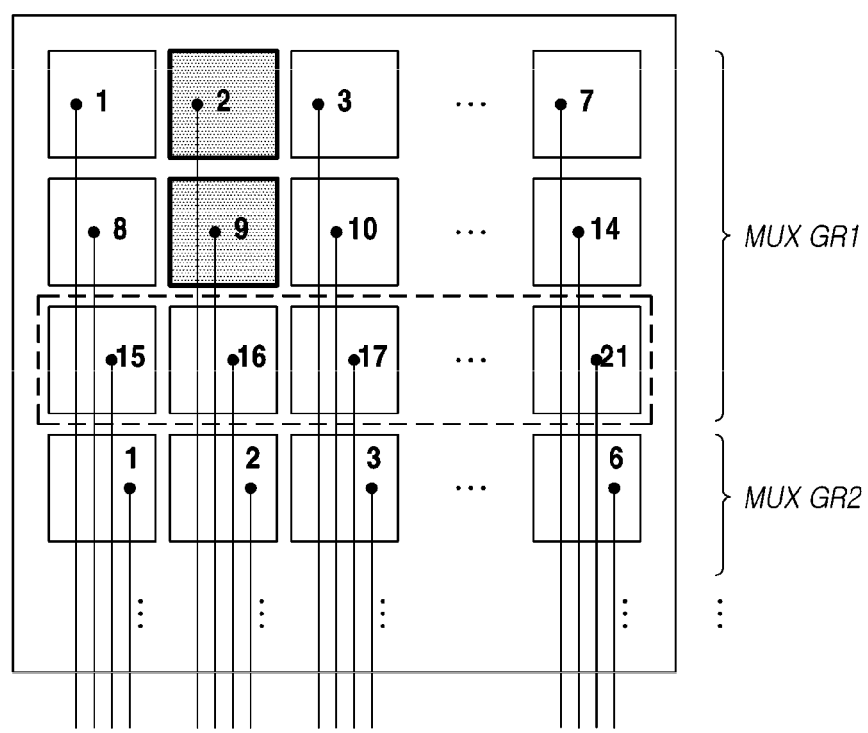

FIGS. 11 to 13 are diagrams illustrating an embodiment in which the multiplexer part of FIG. 8 drives m touch electrodes included in an $x^{th}$ multiplexer group (MUX GRx) row by row and detects whether a short occurs between an upper side and a lower side.

As illustrated in FIG. 10, the multiplexer part (MUX) may connect m touch electrodes included in a predetermined multiplexer group (MUX GRx) to m pre-amplifiers (Pre-AMP1 to Pre-AMPm) at a predetermined point in time.

As illustrated in FIGS. 11 to 13, the multiplexer part (MUX) may connect only a predetermined number of touch electrodes included in a predetermined multiplexer group (MUX GRx) to corresponding pre-amplifiers at a predetermined point in time.

That is, the multiplexer part (MUX) may connect touch electrodes (TE1 to TE7) corresponding to a first column among 21 touch electrodes (TE1 to TE21) to corresponding pre-amplifiers at a predetermined point in time, may connect touch electrodes (TE8 to TE14) corresponding to a second column to corresponding pre-amplifiers, and may connect touch electrodes (TE15 to TE21) corresponding to a third column to corresponding pre-amplifiers.

Figure 14:
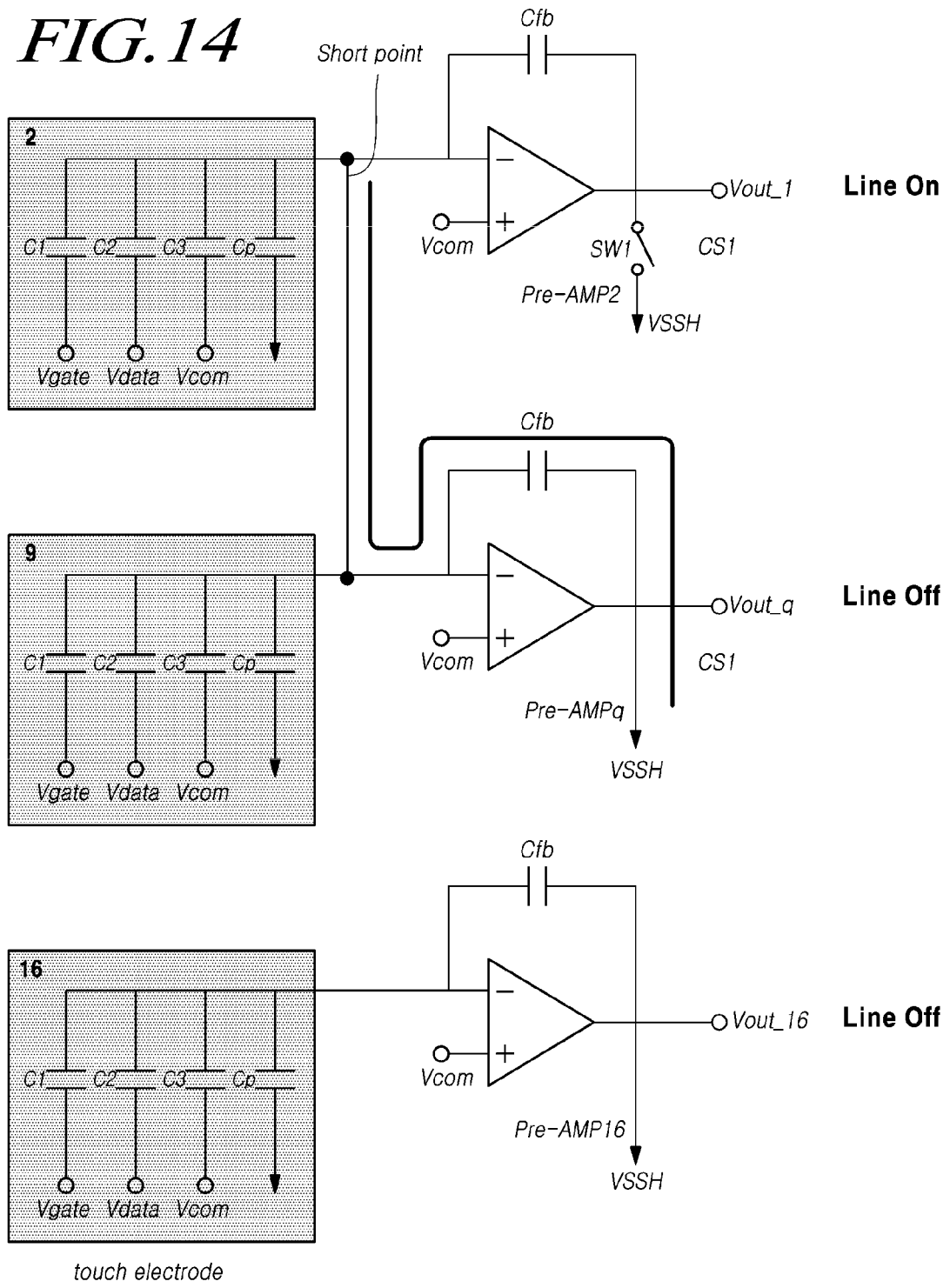
FIG. 14 is a circuit diagram in which the multiplexer part of FIG. 11 connects touch electrodes corresponding to a first column among 21 touch electrodes to corresponding pre-amplifiers at a predetermined point in time, in a touch display device according to another embodiment.

FIG. 14 is a circuit diagram in which the multiplexer part (MUX) of FIG. 11 connects only touch electrodes (TE1 to TE7) corresponding to a first column among 21 touch electrodes (TE1 to TE21) to corresponding pre-amplifiers at a predetermined point in time, in a touch display device according to another embodiment.

Referring to FIG. 14, in a touch display device 1100 according to another embodiment, each of m pre-amplifiers (Pre-AMP1 to Pre-AMPm), for example, each of the three pre-amplifiers (Pre-AMP1 to Pre-AMP3) may include a first switch (SW1) which is disposed between an output end (O) and a ground voltage (VSSH), and is turned on/off by a first control signal (CS1) provided form the touch controller (T-CTR).

The touch controller (T-CTR) may sequentially select n multiplexer groups. In this instance, when one of predetermined multiplexer groups is selected, the touch controller (T-CTR) may drive touch electrodes line by line, by turning on first switches (SW1) included in pre-amplifiers (Pre-AMP) that are electrically connected to touch electrodes (TE) located in a predetermined row among m touch electrodes in each multiplexer group, and turning off first switches (SW1) included in pre-amplifiers (Pre-AMP) electrically connected to touch electrodes (TE) located in another row.

When one of predetermined multiplexer groups is selected, the touch controller (T-CTR) may detect whether a short occurs by turning on touch electrodes included in a predetermined multiplexer group, for each line. Particularly, using a test signal called as a first control signal (CS1), a normal operation mode and a short detection mode for detecting whether a short occurs between upper and lower touch electrodes may be distinguished. Particularly, the first control signal (CS1) may indicate a control signal for turning on/off the first switch disposed between an output end (O) and a ground voltage (VSSH) of a pre-amplifier.

For example, as illustrated in FIG. 14, when one of predetermined multiplexer groups is selected, the touch controller (T-CTR) may turn off, using a first control signal (CS1), first switches (SW1) included in pre-amplifiers (e.g., Pre-AMP 2) that are electrically connected to touch electrodes (e.g., TE2) located in a first row among m touch electrodes in each multiplexer group. Therefore, when one of predetermined multiplexer groups is selected, the touch controller (T-CTR) may drive only pre-amplifiers (Pre-AMP2) electrically connected to touch electrodes (TE2) located in a first row among m touch electrodes in each multiplexer group.

The touch controller (T-CTR) may turn on, using a control signal (CS1), first switches (SW1) included in pre-amplifiers (e.g., Pre-AMP 9 and Pre-AMP 16) electrically connected to touch electrodes (e.g., TE9 and TE16) located in second and third rows. That is, the output ends (o) of the pre-amplifiers (Pre-AMP 9 and Pre-AMP 16) that are electrically connected to the touch electrodes (TE9 and TE16) located in second and third rows are connected to ground voltages (VSSH), and thus, the pre-amplifiers may not be driven.

Therefore, the touch controller (T-CTR) may drive only pre-amplifiers (Pre-AMP2) that are electrically connected to touch electrodes (TE2) located in a first row.

In a touch display device according to an embodiment, when a short occurs between upper and lower touch electrodes in first and second columns as illustrated in FIG. 14, the feedback capacitor (Cfb) of a second pre-amplifier is shown as the input value of a pre-amplifier (Pre-AMP 2) that is electrically connected to currently driven touch electrodes (TE2) located in a first row, such that the output value of the pre-amplifier (Pre-AMP 2) electrically connected to the currently driven touch electrodes (TE2) located in the first row may be higher than a normal value. In this instance, the normal value indicates the output value of a corresponding pre-amplifier when upper and lower touch electrodes are not shorted.

In the same manner, the touch controller (T-CTR) may drive only pre-amplifiers (Pre-AMP 9 and Pre-AMP 16) that are electrically connected to touch electrodes (TE9 and TE16) located in the second and third rows. When the output value of a corresponding pre-amplifier is higher than a normal value, the touch controller (T-CTR) may determine that a touch electrode that is electrically connected to the corresponding pre-amplifier and another touch electrode are shorted.

A touch display device 1100 according to the above-described embodiment checks whether a short occurs by sequentially turning on/off pre-amplifiers for each line, and thus, may detect a short occurring between upper and lower touch electrodes.

A short occurring between upper and lower touch electrodes may include a short occurring between touch lines electrically connected to touch electrodes located up and down and a short occurring between the touch electrode and a touch line thereof, in addition to a short occurring between the touch electrodes located up and down. Therefore, the touch display device according to an embodiment may detect whether a short occurs between touch lines electrically connected to touch electrodes located up and down and between the touch electrode and a touch line thereof, in addition to detecting whether a short occurs between touch electrodes located up and down.

The touch display device 1100 according to the above-described embodiment may drive pre-amplifiers line by line, and thus, may not detect a short occurring between touch electrodes located side to side in the corresponding line.

Hereinafter, another embodiment will be described, in which a display device 1500 detects whether a short occurs between left and right touch electrodes, in addition to detecting whether a short occurs between upper and lower touch electrodes.

Figure 15:
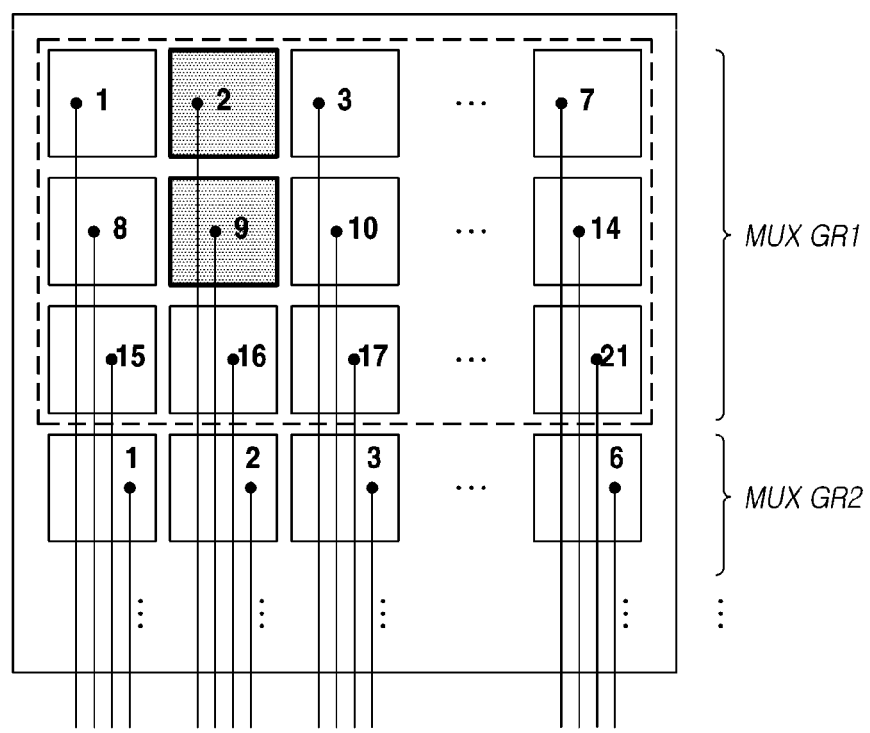
FIG. 15 is a diagram illustrating an embodiment in which the multiplexer part of FIG. 8 drives m touch electrodes included in an $x^{th}$ multiplexer group, group by group, and detects a short occurring between upper and lower touch electrodes and detects a short occurring between left and right touch electrodes.

FIG. 15 is a diagram illustrating an embodiment in which the multiplexer part of FIG. 8 drives m touch electrodes included in an $x^{th}$ multiplexer group (MUX GRx) for each group and detects a short occurring between upper and lower touch electrodes and a short occurring between left and right touch electrodes.

As illustrated in FIG. 15, the multiplexer part (MUX) included in a display device 1500 according to another embodiment may connect all touch electrodes included in a predetermined multiplexer group (MUX GRx) to all corresponding pre-amplifiers at a predetermined point in time. Therefore, the multiplexer part (MUX) may drive m touch electrodes included in an $x^{th}$ multiplexer group (MUX GRx) for each group.

Figure 16:
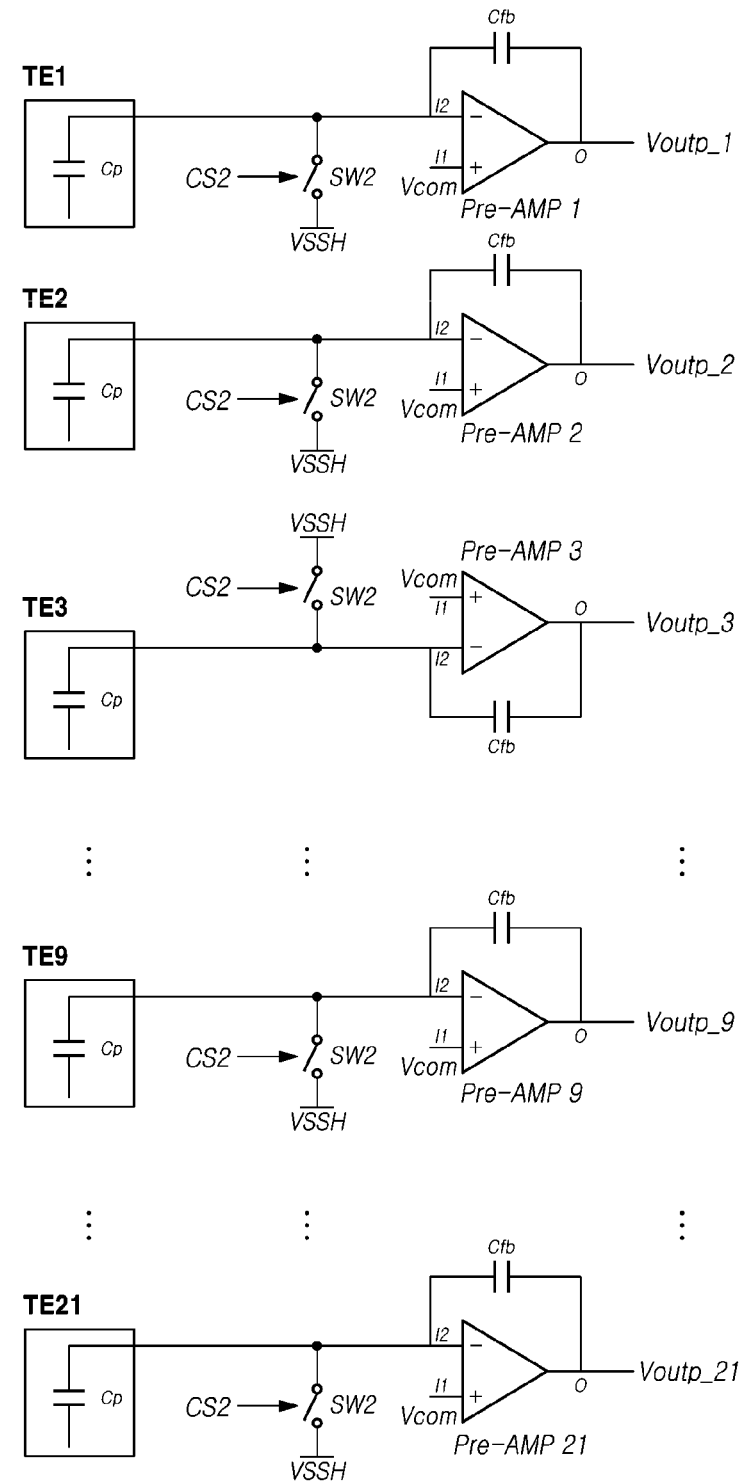
FIG. 16 is a circuit diagram in the state in which all touch electrodes corresponding to 21 touch electrodes are connected to corresponding pre-amplifiers at a predetermined point in time, in a touch display device according to another embodiment.
Figure 17:
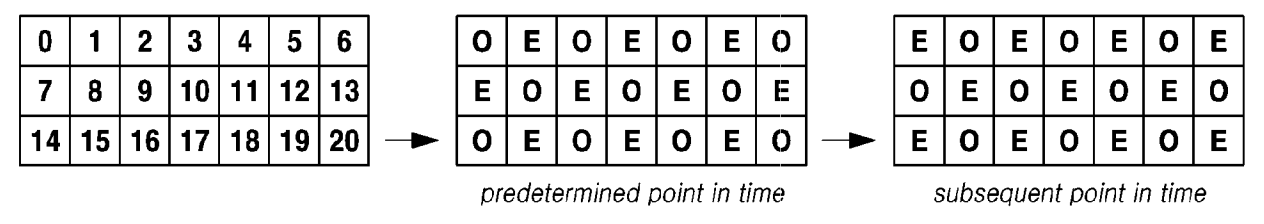

FIG. 16 is a circuit diagram in the state in which all touch electrodes (TE1 to TE21) corresponding to 21 touch electrodes (TE1 to TE21) are connected to corresponding pre-amplifiers at a predetermined point in time, in a touch display device according to another embodiment. FIG. 17 displays values of control signals input into the pre-amplifiers of FIG. 16.

Referring to FIG. 16, the m pre-amplifiers (Pre-AMP) in the display device 1500 according to another embodiment may include second switches (SW2), wherein one end of the second switch is located between a touch electrode (TE) and an input end (I2) that is connected to the touch electrode, and the other end is located in a ground voltage (VSSH). The second switch (SW2) may be turned on/off based on a second control signal (CS2) provided from the touch controller (T-CTR), and may connect the input end (I2) of a pre-amplifier (Pre-AMP) to the ground voltage (VSSH) or may connect the input end (I2) to a corresponding touch electrode.

As illustrated in FIG. 17, the touch controller (T-CTR) may input a second control signal (CS2) to each of the pre-amplifiers (Pre-AMP) to drive the pre-amplifiers (Pre-AMP), and may identify an expected value (e.g., value A (code A) or value B (or code B)) based on the value of the second control signal (CS2(CS_OD) or CS2(CS_EV)), represented in FIG. 17 as an 'O' or an 'E', so as to determine whether a short occurs. In this instance, the touch controller (T-CTR) may provide a predetermined voltage, for example, a common voltage (Vcom) to the other ends (I1) of the pre-amplifiers.

The touch controller (T-CTR) may sequentially select n multiplexer groups at a predetermined point in time. In this instance, when one of multiplexer groups is selected, the touch controller (T-CTR) may alternately turn on/off second switches (SW2) included in pre-amplifiers (Pre-AMP) electrically connected to m touch electrodes (TE) included in the selected multiplexer group. Through the above, whether a short occurs between a touch electrode and a touch line connected to the touch electrode may be detected.

The touch controller (T-CTR) may turn on/off each of second switches (SW2) included in pre-amplifiers (Pre-AMP) that are electrically connected to m touch electrodes (TE) included in a multiplexer group selected at a subsequent point in time, in the opposite order of the order at the predetermined point in time, and may detect whether a short occurs between touch electrodes located up and down, or located side to side, between touch lines that are electrically connected to the touch electrodes located up and down, or side to side, and between the touch electrode and a touch line thereof.

That is, the touch controller (T-CTR) may detect whether a short occurs between touch electrodes located up and down, between touch lines electrically connected to the touch electrodes located up and down, and between the touch electrode and a touch line thereof, based on output values output from the output ends (O) of the pre-amplifiers (Pre-AMP) connected to the touch electrodes (TE) located up and down.

In the same manner, the touch controller (T-CTR) may detect whether a short occurs between touch electrodes located side to side, between touch lines electrically connected to the touch electrodes located side to side, and between the touch electrode and a touch line thereof, based on output values output from the output ends (O) of the pre-amplifiers (Pre-AMP) connected to the touch electrodes (TE) located side to side.

Figure 18:
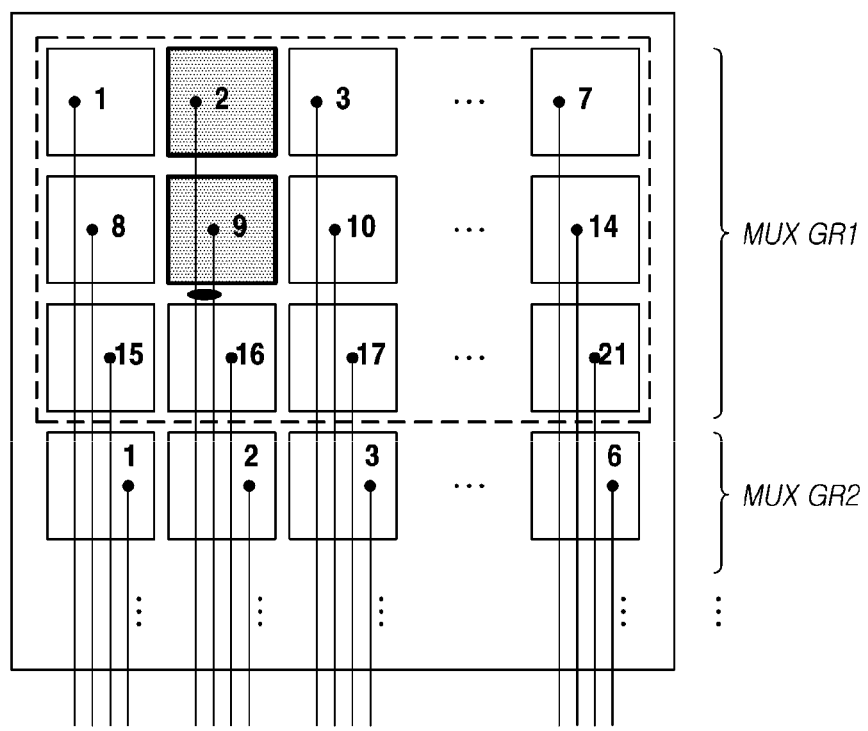
FIGS. 18 and 19 are diagrams illustrating the case in which touch electrode 2 and touch electrode 9 located below touch electrode 2, are shorted in a touch display panel.
Figure 19:
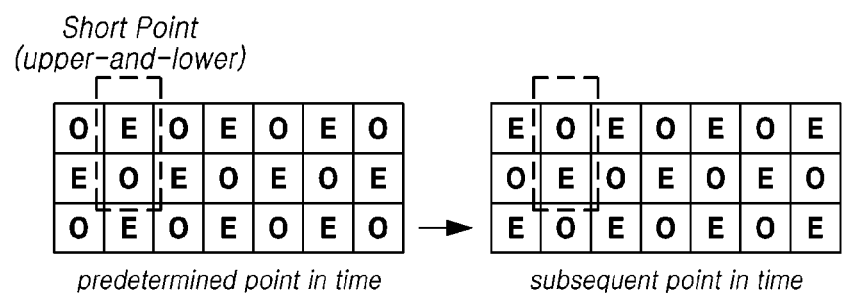
Figure 20:
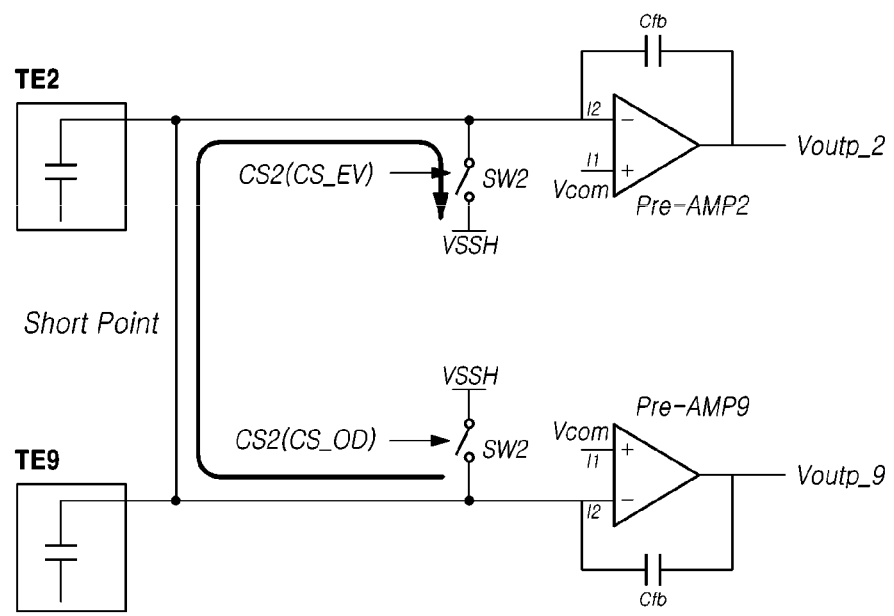
FIG. 20 is a circuit diagram of touch electrodes located up and down and corresponding pre-amplifiers, when the touch electrode 2 and the touch electrode 9 located up and down, respectively, are shorted in a touch display panel.

FIGS. 18 and 19 are diagrams illustrating the case in which upper and lower touch electrodes 2 and 9 (TE2 sand TE9) are shorted in a touch display panel (DISP). FIG. 20 is a circuit diagram of upper and lower touch electrodes and pre-amplifiers corresponding thereto, when the upper and lower touch electrodes 2 and 9 (TE2 sand TE9) are shorted in a touch display panel (DISP).

As illustrated in FIGS. 18 and 19, it is assumed that the upper and lower touch electrodes 2 and 9 (TE2 and TE9) are shorted in a touch display panel (DISP).

In this instance, the upper and lower touch electrodes 2 and 9 (TE2 sand TE9) in a predetermined multiplexer group may be driven by second and ninth pre-amplifier (Pre-AMP2 and Pre-AMP 9), respectively, at a predetermined point in time. A second control signal (CS2(CS_EV)), represented in FIG. 19 as an 'E', is provided to the second switch (SW2) in the second pre-amplifier (Pre-AMP 2) in the upper side, and a second control signal (CS2(CS_OD)), represented in FIG. 19 as an 'O', is provided to the second switch (SW2) in the ninth pre-amplifier (Pre-AMP9) in the lower side.

Normally, one of the pre-amplifiers (Pre-AMP 2 and Pre-AMP9) corresponding to the upper and lower touch electrodes 2 and 9 (TE2 and TE9) may be connected to a ground voltage (VSSH), and the output of the pre-amplifier (Pre-AMP) may be saturated and may have a value A (code A). The other may output a normal value of a touch electrode, and the output of the pre-amplifier (Pre-AMP) may have a value B (code B).

As illustrated in FIG. 20, when the upper and lower touch electrodes 2 and 9 (TE2 and TE9) are shorted, the input of one of the two pre-amplifiers (Pre-AMP 2 and Pre-AMP 9) is a ground voltage (VSSH) and the output of the two pre-amplifiers (Pre-AMP 2 and Pre-AMP 9) is saturated and may have a value A (code A).

That is, in the case in which the expected value of the touch electrode 2 (TE2) is the value A (or code A), and the expected value of the touch electrode 9 (TE9) is the value B (or code B), when the result of testing whether a short occurs shows that the output value of the touch electrode 9 (TE9) is the value A, it is determined that the touch electrode 9 (TE9) is shorted.

The touch controller (T-CTR) may turn on/off each of the second switches (SW2) included in pre-amplifiers (Pre-AMP) that are electrically connected to m touch electrodes (TE) included in a multiplexer group selected at a subsequent point in time, in the opposite order of the order at the predetermined point in time, and may perform the same operation.

A second control signal (CS2(CS_OD)) is provided to the second switch (SW2) in the second pre-amplifier (Pre-AMP 2) in the upper side, and a second control signal (CS2 (CS_EV)) is provided to the second switch (SW2) in the ninth pre-amplifier (Pre-AMP9) in the lower side.

That is, in the case in which the expected value of the touch electrode 2 (TE2) is the value B (or code B), and the expected value of the touch electrode 9 (TE9) is the value A (or code A), when the result of testing whether a short occurs shows that the output value of the touch electrode 2 (TE2) is the value A, it is determined that the touch electrode 2 (TE2) is shorted.

Through the above, it is detected whether a short occurs between touch electrodes 2 and 9 (TE2 and TE9) located up and down, between touch lines electrically connected to the touch electrodes 2 and 9 (TE2 and TE9) located up and down, and between the touch electrode and a touch line thereof.

That is, the touch controller (T-CRT) may detect whether a short occurs between touch electrodes located up and down, between touch lines electrically connected to the touch electrodes located up and down, and between the touch electrode and a touch line thereof, based on output values output from the output ends (O) of the pre-amplifiers (Pre-AMP) connected to the touch electrodes (TE) located up and down.

Figure 21:
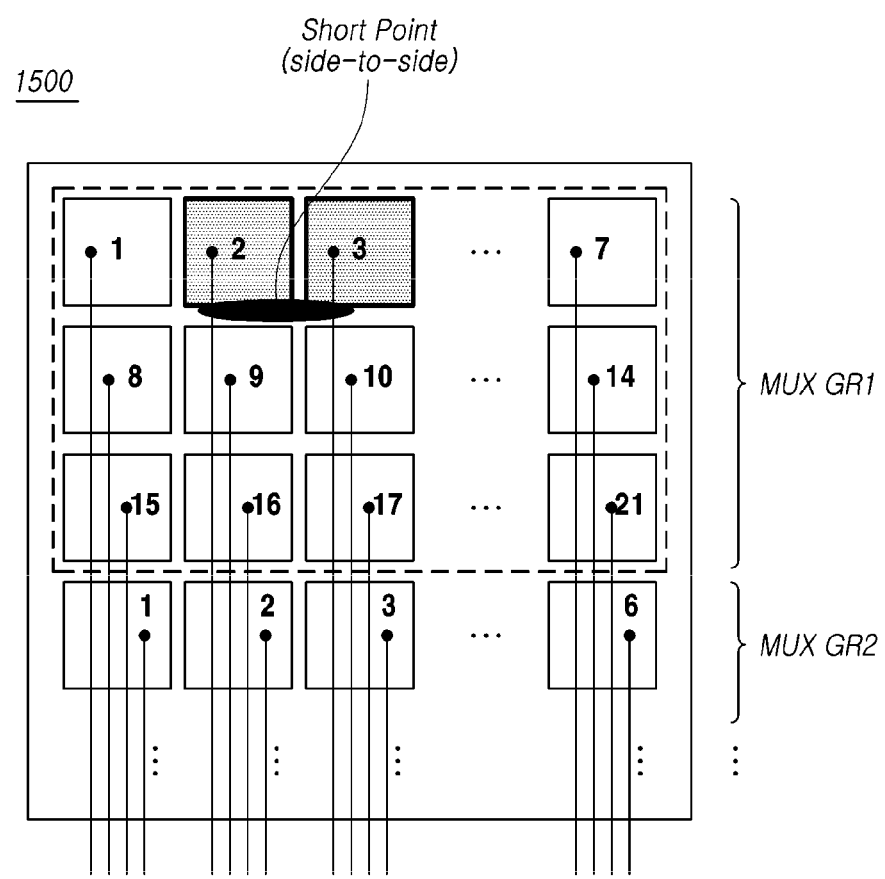
FIGS. 21 and 22 are diagrams illustrating the case in which touch electrode 2 and touch electrode 3 located horizontally adjacent to touch electrode 2 are shorted in a touch display panel.
Figure 22:
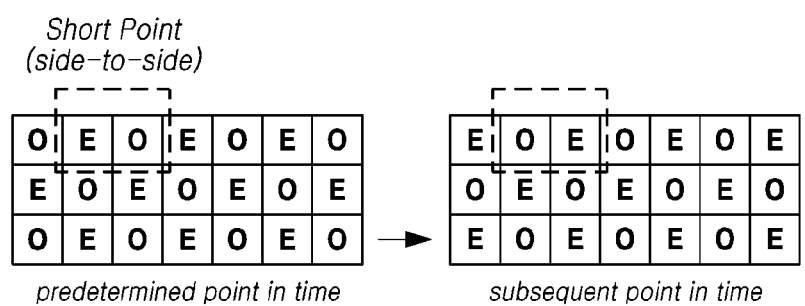
Figure 23:
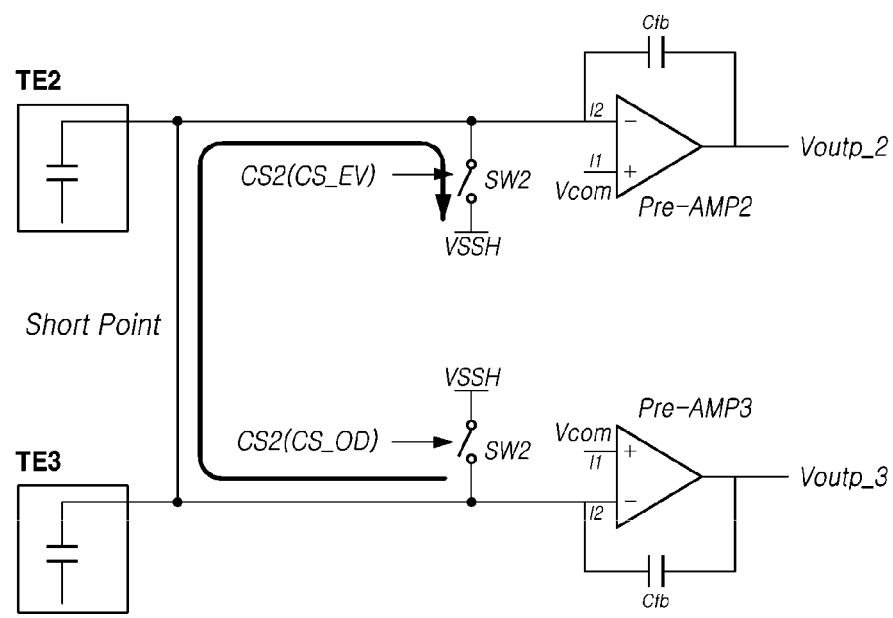
FIG. 23 is a circuit diagram of touch electrodes located side to side and pre-amplifiers corresponding thereto, when the touch electrode 2 and the touch electrode 3 located side to side are shorted in a touch display panel.

FIGS. 21 and 22 are diagrams illustrating the case in which touch electrodes 2 and 3 (TE2 and TE3) located side to side are shorted in a touch display panel (DISP). FIG. 23 is a circuit diagram of left and right touch electrodes and pre-amplifiers corresponding thereto, when the left and right touch electrodes 2 and 3 (TE2 and TE3) are shorted in a touch display panel (DISP).

It is assumed that left and right touch electrodes 2 and 3 (TE2 and TE3) are shorted as illustrated in FIGS. 21 and 22.

In this instance, the left and right touch electrodes 2 and 3 (TE2 sand TE3) in a predetermined multiplexer group may be driven by second and third pre-amplifier (Pre-AMP2 and Pre-AMP 3), respectively. A second control signal (CS2 (CS_EV)), represented in FIG. 22 as an 'E', is provided to the second switch (SW2) in the second pre-amplifier (Pre-AMP 2) in the left side, and a second control signal (CS2(CS_OD)), represented in FIG. 22 as an 'O', is provided to the second switch (SW2) in the third pre-amplifier (Pre-AMP3) in the right side.

Normally, one of the pre-amplifiers (Pre-AMP 2 and Pre-AMP3) corresponding to the left and right touch electrodes 2 and 3 (TE2 and TE3) may be connected to a ground voltage (VSSH), and the output of the pre-amplifier (Pre-AMP) may be saturated and may have a value A (code A). The other may output a normal value of a touch electrode, and the output of the pre-amplifier (Pre-AMP) may have a value B (code B).

As illustrated in FIG. 23, when the left and right touch electrodes 2 and 3 (TE2 and TE3) are shorted, the input of one of the two pre-amplifiers (Pre-AMP 2 and Pre-AMP 3) is a ground voltage (VSSH) and the output of the two pre-amplifiers (Pre-AMP 2 and Pre-AMP 3) is saturated and may have a value A (code A).

That is, in the case in which the expected value of the touch electrode 2 (TE2) is the value A (or code A), and the expected value of the touch electrode 3 (TE3) is the value B (or code B), when the result of testing whether a short occurs shows that the output value of the touch electrode 3 (TE3) is the value A, it is determined that the touch electrode 3 (TE3) is shorted.

The touch controller (T-CTR) may turn on/off each of the second switches (SW2) included in pre-amplifiers (Pre-AMP) that are electrically connected to m touch electrodes (TE) included in a multiplexer group selected at a subsequent point in time, in the opposite order of the order at the predetermined point in time, and may perform the same operation. Through the above, it is detected whether a short occurs between touch electrodes located up and down, or side to side, between touch lines electrically connected to the touch electrodes located up and down, or side to side, and between the touch electrode and a touch line thereof.

A second control signal (CS2(CS_OD)) is provided to the second switch (SW2) in the second pre-amplifier (Pre-AMP 2) in the left side, and a second control signal (CS2 (CS_EV)) is provided to the second switch (SW2) in the third pre-amplifier (Pre-AMP3) in the right side.

That is, in the case in which the expected value of the touch electrode 2 (TE2) is the value B (or code B), and the expected value of the touch electrode 3 (TE3) is the value A (or code A), when the result of testing whether a short occurs shows that the output value of the touch electrode 2 (TE2) is the value A, it is determined that the touch electrode 2 (TE2) is shorted.

Through the above, it is detected whether a short occurs between touch electrodes 2 and 3 (TE2 and TE3) located side to side, between touch lines electrically connected to the touch electrodes 2 and 3 (TE2 and TE3) located side to side, and between the touch electrode and a touch line thereof.

In the same manner, the touch controller (T-CTR) may detect whether a short occurs between touch electrodes located side to side, between touch lines electrically connected to the touch electrodes located side to side, and between the touch electrode and a touch line thereof, based on output values output from the output ends (O) of the pre-amplifiers (Pre-AMP) connected to the touch electrodes (TE) located side to side.

When each integrated circuit (SRIC) includes two touch driving circuits (TDC) as illustrated in FIG. 7, the two touch driving circuits (TDC) may detect whether a short occurs in two groups separated in the touch display panel (DISP), for example, upper and lower groups or left and right groups.

According to settings, different second control signal values (CS2(CS_OD) and CS2(CS_EV)) may be input to pre-amplifiers connected to neighboring touch electrodes included in two groups. According to settings, an odd numbered second control signal and an even numbered second control signal are alternately input to touch electrodes, whereby whether a short occurs between upper and lower touch electrodes, or left and right touch electrodes may be detected. Through the above, whether a short occurs may be detected between touch electrodes included in two groups, which are driven by two different touch driving circuits (TDC) and are separated in the touch display panel (DISP).

The above-described touch display device 1500 according to another embodiment may detect whether a short occurs between upper and lower touch electrodes and whether a short occurs between left and right touch electrodes.

According to embodiments of the present disclosure, there may be provided a touch display device and a driving circuit, which may detect whether a short circuit occurs in a predetermined touch electrode (TE), between touch electrodes (TE), and between a plurality of touch lines (TL).

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A touch display device, comprising:
   a touch display panel in which touch electrodes and a plurality of touch lines are disposed, wherein the touch electrodes are divided into n multiplexer groups and each multiplexer group comprises m touch electrodes, and the plurality of touch lines correspond to and are electrically connected to the touch electrodes, wherein n is a natural number greater than 1 and m is a natural number greater than 1;
   a touch driving circuit comprising a multiplexer part and a pre-amplifying part, and configured to drive the touch electrodes, wherein the multiplexer part comprises m multiplexer circuits and each multiplexer circuit is electrically connected to touch lines each electrically connected to one of the m touch electrodes included in each of the n multiplexer groups, and the pre-amplifying part comprises m pre-amplifiers, input ends of which are electrically connected to the m multiplexer circuits, respectively; and a touch controller configured to detect an existence of a touch or a location of a touch performed by one or more of a finger and a pen, based on touch sensing data received from the touch driving circuit, wherein each of the m pre-amplifiers comprises a first switch which is connected between an output end and a ground voltage and is turned on/off based on a first control signal provided from the touch controller, and the touch controller is configured to sequentially turn on the first switch included in each of the m pre-amplifiers, so as to detect at least one of: whether a short occurs between touch electrodes located adjacent to each other, whether a short occurs between touch lines electrically connected to the touch electrodes located adjacent to each other, or whether a short occurs between the touch electrode and a touch line thereof.

2. The touch display device of claim 1, wherein the m touch electrodes included in each of the n multiplexer groups are disposed in a form of a matrix including two or more rows and two or more columns.

3. The touch display device of claim 2, wherein
the touch controller sequentially selects the n multiplexer groups, and when one of predetermined multiplexer groups is selected, drives touch electrodes for each line by turning on first switches included in pre-amplifiers electrically connected to touch electrodes located in a predetermined row among the m touch electrodes in each of the multiplexer group, and turning off first switches included in pre-amplifiers electrically connected to touch electrodes located in another row, so as to detect at least one of: whether a short occurs between touch electrodes located up and down, whether a short occurs between touch lines electrically connected to the touch electrodes located up and down, or whether a short occurs between the touch electrode and a touch line thereof.

4. The touch display device of claim 2, wherein each of the m pre-amplifiers comprises a second switch, one end of which is located between the touch electrode and an input end connected to the touch electrode, and another end of which is located in a ground voltage, and which is turned on/off based on a second control signal provided from the touch controller, and
the touch controller sequentially selects the n multiplexer groups at a predetermined point in time, and when one of the multiplexer groups is selected, alternately turns on/off each of second switches included in pre-amplifiers electrically connected to m touch electrodes included in the selected multiplexer group, so as to detect whether a short occurs between a touch electrode and a touch line connected to the touch electrode.

5. The touch display device of claim 4, wherein the touch controller turns on/off each of second switches included in pre-amplifiers electrically connected to m touch electrodes included in a multiplexer group selected at a subsequent point in time, in an opposite order of the order of the predetermined point in time, so as to detect at least one of: whether a short occurs between touch electrodes located up and down or side to side, whether a short occurs between touch lines electrically connected to the touch electrodes located up and down or side to side, or whether a short occurs between the touch electrode and a touch line thereof.

6. The touch display device of claim 5, wherein the touch controller detects at least one of: whether a short occurs between touch electrodes located up and down, whether a short occurs between touch lines electrically connected to the touch electrodes located up and down, or whether a short occurs between the touch electrode and a touch line thereof, based on output values output from output ends of pre-amplifiers connected to the touch electrodes located up and down.

7. The touch display device of claim 5, wherein the touch controller detects at least one of: whether a short occurs between touch electrodes located side to side, whether a short occurs between touch lines electrically connected to the touch electrodes located side to side, or whether a short occurs between the touch electrode and a touch line thereof, based on output values output from output ends of pre-amplifiers connected to the touch electrodes located side to side.

8. A touch driving circuit driving a touch display panel in which touch electrodes and a plurality of touch lines are disposed, wherein the touch electrodes are divided into n multiplexer groups and each multiplexer group comprises m touch electrodes, and the plurality of touch lines correspond to and are electrically connected to the touch electrodes, wherein n is a natural number greater than 1 and m is a natural number greater than 1, the touch driving circuit comprising:

a multiplexer part comprising m multiplexer circuits and each multiplexer circuit is electrically connected to one of m touch lines electrically connected to m touch electrodes included in each of the n multiplexer groups;

a pre-amplifying part comprising m pre-amplifiers, input ends of which are electrically connected to the m multiplexer circuits, respectively; and a touch controller configured to detect an existence of a touch or a location of a touch performed by one or more of a finger and a pen, based on touch sensing data received from the touch driving circuit, wherein each of the m pre-amplifiers comprises a first switch which is connected between an output end and a ground voltage and is turned on/off based on a first control signal provided from the touch controller, and the touch controller is configured to sequentially turn on the first switch included in each of the m pre-amplifiers, so as to detect at least one of: whether a short occurs between touch electrodes located adjacent to each other, whether a short occurs between touch lines electrically connected to the touch electrodes located adjacent to each other, or whether a short occurs between the touch electrode and a touch line thereof.

9. The touch driving circuit of claim 8, wherein the m touch electrodes included in each of the n multiplexer groups are disposed in a form of a matrix including two or more rows and two or more columns.

10. The touch driving circuit of claim 8,
the touch controller sequentially selects the n multiplexer groups, and when one of predetermined multiplexer groups is selected, drives touch electrodes for each line by turning on first switches included in pre-amplifiers electrically connected to touch electrodes located in a predetermined row among the m touch electrodes in each of the multiplexer group, and turning off first switches included in pre-amplifiers electrically connected to touch electrodes located in another row, so as to detect at least one of: whether a short occurs between touch electrodes located up and down, whether a short occurs between touch lines electrically connected to the touch electrodes located up and down, or whether a short occurs between the touch electrode and a touch line thereof.

11. The touch driving circuit of claim 8, wherein each of the m pre-amplifiers comprises a second switch, one end of which is located between the touch electrode and an input end connected to the touch electrode and another end of which is located in a ground voltage, and the second switch is turned on/off based on a second control signal provided from the touch controller, and the touch controller sequentially selects the n multiplexer groups at a predetermined point in time, and when one of predetermined multiplexer groups is selected, drives touch electrodes for each selected multiplexer group by differently turning on/off second switches included in pre-amplifiers electrically connected to touch electrodes located in a predetermined row among m touch electrodes in each multiplexer group, so as to detect whether a short occurs between a touch electrode and a touch line connected to the touch electrode.

12. The touch driving circuit of claim 11, wherein the touch controller turns on/off each of second switches included in pre-amplifiers electrically connected to m touch electrodes included in a multiplexer group selected at a subsequent point in time, in an opposite order of the order at the predetermined point in time, so as to detect at least one of: whether a short occurs between touch electrodes located up and down or side to side, whether a short occurs between touch lines electrically connected to the touch electrodes located up and down or side to side, or whether a short occurs between the touch electrode and a touch line thereof.

13. The touch driving circuit of claim 12, wherein the touch controller detects at least one of: whether a short occurs between touch electrodes located up and down, whether a short occurs between touch lines electrically connected to the touch electrodes located up and down, or whether a short occurs between the touch electrode and a touch line thereof, based on output values output from output ends of pre-amplifiers connected to the touch electrodes located up and down.

14. The touch driving circuit of claim 12, wherein the touch controller detects at least one of: whether a short occurs between touch electrodes located side to side, whether a short occurs between touch lines electrically connected to the touch electrodes located side to side, or whether a short occurs between the touch electrode and a touch line thereof, based on output values output from output ends of pre-amplifiers connected to the touch electrodes located side to side.

* * * * *